United States Patent
Jönsson et al.

(10) Patent No.: US 12,253,179 B2
(45) Date of Patent: Mar. 18, 2025

(54) VALVE UNIT FOR A VEHICLE THERMAL MANAGEMENT SYSTEM, A VEHICLE THERMAL MANAGEMENT SYSTEM, AND A METHOD FOR OPERATING A VALVE UNIT

(71) Applicants: Ningbo Geely Automobile Research & Development Co., Ltd., Ningbo (CN); Zhejiang Geely Holding Group Co., Ltd., Zhejiang (CN)

(72) Inventors: Mikael Jönsson, Onsala (SE); Tamara Dragic, Gothenburg (SE); Ulf Bergman, Torslanda (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 99 days.

(21) Appl. No.: 18/205,230

(22) Filed: Jun. 2, 2023

(65) Prior Publication Data

US 2023/0304590 A1    Sep. 28, 2023

Related U.S. Application Data

(63) Continuation of application No. PCT/CN2021/137363, filed on Dec. 13, 2021.

(30) Foreign Application Priority Data

Dec. 15, 2020 (EP) .................................. 20214214

(51) Int. Cl.
*F16K 11/085* (2006.01)
*B60H 1/00* (2006.01)
*F16K 11/16* (2006.01)

(52) U.S. Cl.
CPC ........ *F16K 11/0853* (2013.01); *F16K 11/165* (2013.01); *B60H 1/00885* (2013.01)

(58) Field of Classification Search
CPC ........... B60H 1/00885; F01P 2007/146; F16K 11/076; F16K 11/0853; F16K 11/0856;
(Continued)

(56) References Cited

U.S. PATENT DOCUMENTS

| | | |
|---|---|---|
| 2013/0048084 A1 | 2/2013 | Bartnick |
| 2015/0286224 A1 | 10/2015 | Bartonek |

(Continued)

FOREIGN PATENT DOCUMENTS

| | | |
|---|---|---|
| CN | 106574543 A | 4/2017 |
| CN | 107269429 A | 10/2017 |

(Continued)

OTHER PUBLICATIONS

Machine English translation of DE102015210763A1 (Year: 2024).*

(Continued)

*Primary Examiner* — Hailey K. Do
(74) *Attorney, Agent, or Firm* — Tucker Ellis LLP

(57) ABSTRACT

A valve unit for a vehicle thermal management system. The valve unit includes a first valve body, a second valve body, and a housing structure. The first valve body and the second valve body are arranged within the housing structure and rotatably arranged in relation to the housing structure between different valve positions around a common rotational axis. The first valve body is connected to an actuator for rotational displacement of the first valve body around the rotational axis, and the second valve body is connected to the first valve body via a spring. The second valve body is configured for being rotatably displaced around the rotational axis by the spring upon rotational displacement of the first valve body. The housing structure includes a first (Continued)

mixing chamber arranged in connection to the first valve body and a second mixing chamber arranged in connection to the second valve body.

17 Claims, 14 Drawing Sheets

(58) Field of Classification Search
CPC .............. F16K 11/163; F16K 11/165; Y10T 137/87016; Y10T 137/8704
See application file for complete search history.

(56) References Cited

U.S. PATENT DOCUMENTS

2019/0063623 A1   2/2019  Dragojlov
2021/0301926 A1*  9/2021  Lee ..................... F16K 11/163

FOREIGN PATENT DOCUMENTS

| | | |
|---|---|---|
| CN | 107542570 A | 1/2018 |
| CN | 108758010 A | 11/2018 |
| CN | 109252937 A | 1/2019 |
| CN | 209195565 U | 8/2019 |
| CN | 110700933 A | 1/2020 |
| DE | 10304837 A1 | 8/2004 |
| DE | 102009004157 B3 | 4/2010 |
| DE | 102012220451 A1 | 6/2014 |
| DE | 102015210763 A1 * | 12/2016 |
| DE | 102017209481 A1 | 12/2018 |
| KR | 102120004 B1 | 6/2020 |
| SE | 541222 C2 | 5/2019 |
| WO | 2015013323 A1 | 1/2015 |

OTHER PUBLICATIONS

International Search Report from corresponding International Application No. PCT/CN2021/137363, mailed on Mar. 9, 2022, 2 pages.

* cited by examiner

VALVE UNIT FOR A VEHICLE THERMAL MANAGEMENT SYSTEM, A VEHICLE THERMAL MANAGEMENT SYSTEM, AND A METHOD FOR OPERATING A VALVE UNIT

RELATED APPLICATION DATA

This application is a continuation of International Patent Application No. PCT/CN2021/137363, filed Dec. 13, 2021, which claims the benefit of European Patent Application No. 20214214.7, filed Dec. 15, 2020, the disclosures of which are incorporated herein by reference in their entireties.

TECHNICAL FIELD

The present disclosure relates to a valve unit for a vehicle thermal management system. The valve unit comprises a first valve body, a second valve body, and a housing structure. The first valve body and the second valve body are arranged within the housing structure and rotatably arranged in relation to the housing structure between different valve positions around a common rotational axis. The disclosure further relates to a vehicle thermal management system comprising a valve unit, a vehicle comprising a thermal management system, and a method for operating a valve unit.

BACKGROUND

Vehicle thermal management systems are commonly used in today's vehicles for controlling the temperature ranges of different vehicle units, such as for example battery units, power electronics units, heating, ventilation and air conditioning (HVAC) systems, and other types of vehicle units or components being part of the vehicle construction. In for example new energy vehicles, such as for example hybrid or electric vehicles, including battery electric vehicles, fuel-cell electric vehicles and plug-in hybrid electric vehicles, the high voltage battery components used for providing energy to the electric motors as well as the power electronic components need to be temperature controlled. The temperature controlling may depend on for example the driving conditions of the vehicle, the ambient temperature, and the type of components used in the vehicle system. The thermal management of the vehicle is constructed for cooling or heating the respective vehicle systems.

For new energy vehicles, the thermal management systems need a redesign compared to the systems used in traditional vehicles with internal combustion engines. These systems are often complex in design and construction, involving a high number of components that take up space in the vehicle and increase the weight of the vehicle construction. This leads to component packaging problems and weight issues, and further, the thermal management systems are often expensive and non-flexible in construction.

There is thus a need for improved thermal management systems, where the systems are simple in design and construction with fewer components compared to current systems used, where the system further is designed to reduce weight and packaging problems.

SUMMARY

An object of the present disclosure is to provide a valve unit for a vehicle thermal management system, a vehicle thermal management system, a vehicle comprising a vehicle thermal management system, and a method for operating a valve unit, where the previously mentioned problems are avoided.

The disclosure concerns a valve unit for a vehicle thermal management system. The valve unit comprises a first valve body, a second valve body, and a housing structure. The first valve body and the second valve body are arranged within the housing structure and rotatably arranged in relation to the housing structure between different valve positions around a common rotational axis. The first valve body is connected to an actuator for rotational displacement of the first valve body around the rotational axis, and the second valve body is connected to the first valve body via a spring. The second valve body is configured for being rotatably displaced around the rotational axis by the spring upon rotational displacement of the first valve body. The housing structure comprises a first mixing chamber arranged in connection to the first valve body and a second mixing chamber arranged in connection to the second valve body.

Advantages with these features are that the thermal management system through the design and configuration of the valve unit can be made with a compact design having a low weight compared to traditional systems. These systems can further be made with a less complex design and construction with the attachment of system components to the valve unit, which is reducing the number of system components taking up space in the vehicle. The valve unit is thus simplifying the component packaging and is providing a flexible and less expensive construction of the system. The solution is simple in design with fewer components compared to current systems used, providing reduced weight. The valve unit is simplifying the integration of different components with each other, and integrating system components in an efficient way is increasingly important for simplifying component packaging. The valve unit is with its unique configuration allowing controlling of more than only one system component in an efficient way through the actuation with only one actuator and the spring. The valve unit can be made with a compact and robust design that is reducing the need for a high number of different system components. The spring is arranged as an elastic element, and may have any suitable design and configuration for rotatably displacing the second valve body around the rotational axis upon rotational displacement of the first valve body. The mixing chambers are allowing an efficient mixing of different flows of heat transfer fluid. The respective mixing chambers are arranged as internal volumes in the valve unit for receiving flows of heat transfer fluid from inlet flow ports and distributing a mixed flow of heat transfer fluid to outlet flow ports, and through the mixing chambers, the valve unit is allowing heat transfer fluid from different loops or circuits to be mixed, such as thermal control loops. The arrangement of the mixing chambers in connection to the valve bodies is enabling the compact design of the valve unit, without the need for separate mixing arrangements, which is providing reduced packaging space.

According to an aspect of the disclosure, the spring is configured for rotatably displacing the second valve body upon a spring tension at least equal to a predetermined spring tension value, and below the predetermined spring tension value the second valve body is prevented from being rotatably displaced by the spring. The spring tension is dependent on a relative angular displacement of the first valve body in relation to the second valve body around the axis. With this configuration, the positioning of the second valve body in relation to the housing structure is achieved in a simple and reliable way.

According to another aspect of the disclosure, the spring is a torsion spring. A torsion spring is simple and reliable in construction and is efficiently transferring torque from the first valve body to the second valve body for displacing the second valve body in relation to the housing structure.

According to an aspect of the disclosure, the spring comprises a first end attached to the first valve body and a second end attached to the second valve body. With the attachment of the spring ends, an efficient controlling of the valve unit can be achieved. The spring ends are suitably configured as bended portions of the spring and each of the valve bodies may comprise a slot or similar arrangement for attaching the respective spring ends to the corresponding valve body. With the attachment of the spring ends to the respective valve bodies, a rotational force can be transferred by the spring from the first valve body to the second valve body, when the first valve body is rotated by the actuator.

According to another aspect of the disclosure, the spring or the second valve body comprises a protruding element, wherein the protruding element is configured for being rotatably displaced with the second valve body and configured for limiting the rotational movement of the second valve body in relation to the housing structure. The protruding element is securing a correct positioning of the second valve body in relation to the housing structure between different valve body positions.

According to a further aspect of the disclosure, the housing structure comprises a first blocking member and a second blocking member, and the protruding element is configured for interacting with the first blocking member and the second blocking member. The first blocking member and the second blocking member are configured for allowing displacement of the second valve body in relation to the housing structure when the protruding element is rotatably displaced with the second valve body between the first blocking member and the second blocking member. The first blocking member and the second blocking member are configured for preventing displacement of the second valve body in relation to the housing structure through engagement between the protruding element and the first blocking member or through engagement between the protruding element and the second blocking member. The blocking members are in this way controlling the positions of the second valve body, where the second valve body is allowed to rotate in relation to the housing structure with a certain angular displacement when the protruding element is displaced between the blocking members. The blocking members are through the engagement with the protruding element efficiently limiting the displacement of the second valve body beyond predefined limits, which may vary depending on the design and construction of the valve unit.

According to an aspect of the disclosure, the protruding element is extending radially outside of the second valve body, wherein the protruding element is configured for being movably arranged within a slot of the housing structure. The slot is delimited by the first blocking member and the second blocking member. The interaction between the protruding element and the slot is securing an efficient control of the positions of the second valve body.

According to another aspect of the disclosure, the first valve body is attached to the actuator via a drive shaft. The drive shaft is securing an efficient displacement of the first valve body upon actuation from the actuator. The drive shaft may have any suitable configuration for rotating the first valve body in relation to the housing structure.

According to an aspect of the disclosure, the first mixing chamber is arranged as an internal volume in the valve unit configured for receiving heat transfer fluid flow from two or more inlet flow ports of the housing structure via the first valve body, and distributing a mixed flow of heat transfer fluid to one or more outlet flow ports of the housing structure via the first valve body. The second mixing chamber is arranged as an internal volume in the valve unit configured for receiving heat transfer fluid flow from two or more inlet flow ports of the housing structure via the second valve body, and distributing a mixed flow of heat transfer fluid to one or more outlet flow ports of the housing structure via the second valve body. The internal volumes of the mixing chambers are allowing an efficient mixing of different flows of heat transfer fluid with a compact design of the valve unit. The inlet flow ports are distributing the heat transfer fluid to the respective mixing chambers for further distribution of the mixed flows via the outlet flow ports.

According to a further aspect of the disclosure, the housing structure comprises a first inlet flow port, a second inlet flow port, a first outlet flow port, and a second outlet flow port, configured for connecting the housing structure to at least a first thermal control loop and a second thermal control loop, and configured for being in fluid communication with the first valve body. The housing structure comprises a third inlet flow port, a fourth inlet flow port, a third outlet flow port, and a fourth outlet flow port, configured for connecting the housing structure to at least the first thermal control loop and the second thermal control loop, and configured for being in fluid communication with the second valve body. The connection to the thermal control loops are providing a simple construction of the vehicle thermal management system with a high flexibility for the temperature control of vehicle units or components.

According to an aspect of the disclosure, the first valve body comprises a first valve flow channel and a second valve flow channel. The first valve flow channel is configured for connecting the first inlet flow port or the second inlet flow port to the first outlet flow port or the second outlet flow port. The second valve flow channel is configured for connecting the first inlet flow port or the second inlet flow port to the first outlet flow port or the second outlet flow port. The second valve body comprises a third valve flow channel and a fourth valve flow channel. The third valve flow channel is configured for connecting the third inlet flow port or the fourth inlet flow port to the third outlet flow port or the fourth outlet flow port. The fourth valve flow channel is configured for connecting the third inlet flow port or the fourth inlet flow port to the third outlet flow port or the fourth outlet flow port. The valve flow channels are securing an efficient functionality of the valve unit for the distribution of heat transfer fluid into different flows, and depending on the position of the valve flow channels in relation to the flow ports different flow patterns can be established for controlling the temperature of vehicle units or components.

According to another aspect of the disclosure, the first valve flow channel and the second valve flow channel are separately arranged from each other within the first valve body. The third valve flow channel and the fourth valve flow channel are separately arranged from each other within the second valve body. By separating the flow channels, there is no mixing of heat transfer fluid between the valve flow channels for a controlled flow of heat transfer fluid.

According to a further aspect of the disclosure, the first valve body comprises a first mixing flow channel, a second mixing flow channel, a third mixing flow channel, and a fourth mixing flow channel, where each mixing flow channel is configured for connecting any of the first inlet flow port, the second inlet flow port, the first outlet flow port, and the second outlet flow port to the first mixing chamber. The second valve body comprises a fifth mixing flow channel, a sixth mixing flow channel, a seventh mixing flow channel, and an eight mixing flow channel, where each mixing flow channel is configured for connecting any of the third inlet flow port, the fourth inlet flow port, the third outlet flow port, and the fourth outlet flow port to the second mixing chamber. The mixing chambers are allowing an efficient mixing of different flows of heat transfer fluid. The respective mixing chambers are arranged as internal volumes in the valve unit for receiving heat transfer fluid flow from the respective corresponding inlet flow ports and distributing a mixed flow of heat transfer fluid to the respective corresponding outlet flow ports, and thus allowing heat transfer fluid from different loops or circuits to be mixed.

The disclosure further concerns a vehicle thermal management system comprising a valve unit as described above. The system further comprises a first thermal control loop in fluid communication with the valve unit, and a second thermal control loop in fluid communication with the valve unit. The control loops are securing an efficient temperature control functionality of vehicle units or components.

The disclosure further concerns a vehicle comprising a vehicle thermal management system as described above.

The disclosure further concerns a method for operating a valve unit for a vehicle thermal management system. The valve unit comprises a first valve body, a second valve body, and a housing structure. The first valve body and the second valve body are arranged within the housing structure and rotatably arranged in relation to the housing structure between different valve positions around a common rotational axis. The first valve body is connected to an actuator for rotational displacement of the first valve body around the rotational axis, and the second valve body is connected to the first valve body via a spring. The housing structure comprises a first mixing chamber arranged in connection to the first valve body and a second mixing chamber arranged in connection to the second valve body. The method comprises the steps: rotatably displacing the first valve body around the rotational axis by means of the actuator; and rotatably displacing the second valve body around the rotational axis by means of the spring upon rotational displacement of the first valve body.

Advantages with these features are that the thermal management system through the design and configuration of the valve unit can be operated in a simple manner, where the system can be made with a compact design having a low weight compared to traditional systems. These systems can further be made with a less complex design and construction with the attachment of system components to the valve unit, which is reducing the number of system components taking up space in the vehicle. The simple operation with the valve bodies arranged in the same housing structure and the efficient controlling of the valve bodies by means of the actuator and the spring is further simplifying the system control functionality. The valve unit is thus simple to operate and is further simplifying the component packaging and is providing a flexible and less expensive construction of the system. The valve unit is providing an efficient control of and integration of different components with each other. The valve unit is with its unique configuration allowing controlling of more than only one system component in an efficient way through the actuation with only one actuator and the spring. The valve unit can be made with a compact and robust design that is reducing the need for a high number of different system components. The spring is arranged as an elastic element, and may have any suitable design and configuration for rotatably displacing the second valve body around the rotational axis upon rotational displacement of the first valve body. The spring is suitably configured as a traditional torsion spring. The mixing chambers are allowing an efficient mixing of different flows of heat transfer fluid. The respective mixing chambers are arranged as internal volumes in the valve unit for receiving heat transfer fluid.

According to an aspect of the disclosure, the first mixing chamber is arranged as an internal volume in the valve unit and the second mixing chamber is arranged as an internal volume in the valve unit. The method further comprises the steps: receiving heat transfer fluid flow from two or more inlet flow ports of the housing structure via the first valve body into the first mixing chamber, mixing the heat transfer fluid from the two or more inlet flow ports in the first mixing chamber, distributing a mixed flow of heat transfer fluid from the first mixing chamber to one or more outlet flow ports of the housing structure via the first valve body; and/or receiving heat transfer fluid flow from two or more inlet flow ports of the housing structure via the second valve body into the second mixing chamber, mixing the heat transfer fluid from the two or more inlet flow ports in the second mixing chamber, distributing a mixed flow of heat transfer fluid from the second mixing chamber to one or more outlet flow ports of the housing structure via the second valve body. With the method, the internal volumes of the mixing chambers are efficiently mixing different flows of heat transfer fluid. The inlet flow ports are distributing the heat transfer fluid to the respective mixing chambers for further distribution of the mixed flows via the outlet flow ports.

BRIEF DESCRIPTION OF THE DRAWINGS

The disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
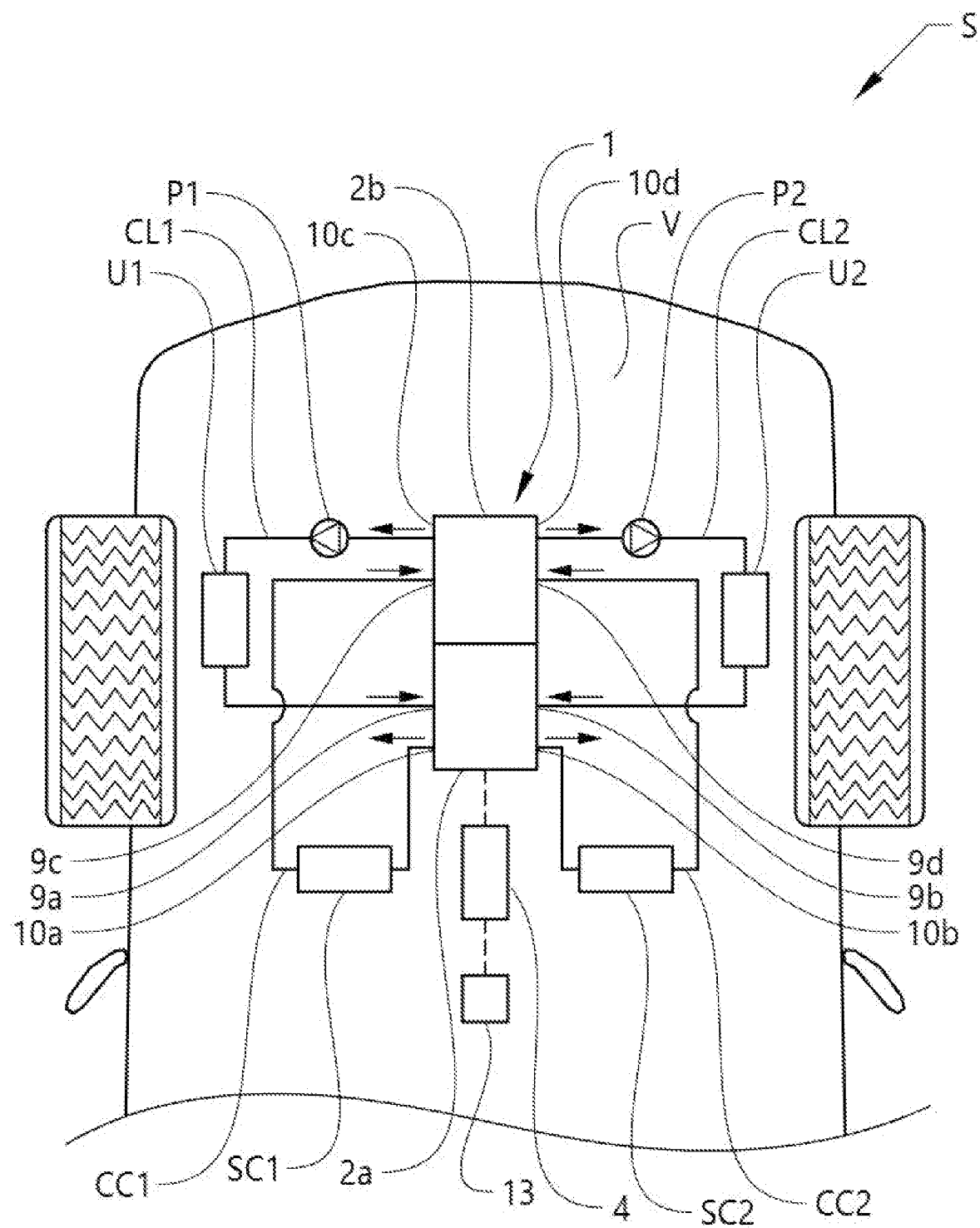
FIG. 1 shows schematically, in a system layout view, a vehicle thermal management system with a valve unit according to the disclosure.
Figure 2:
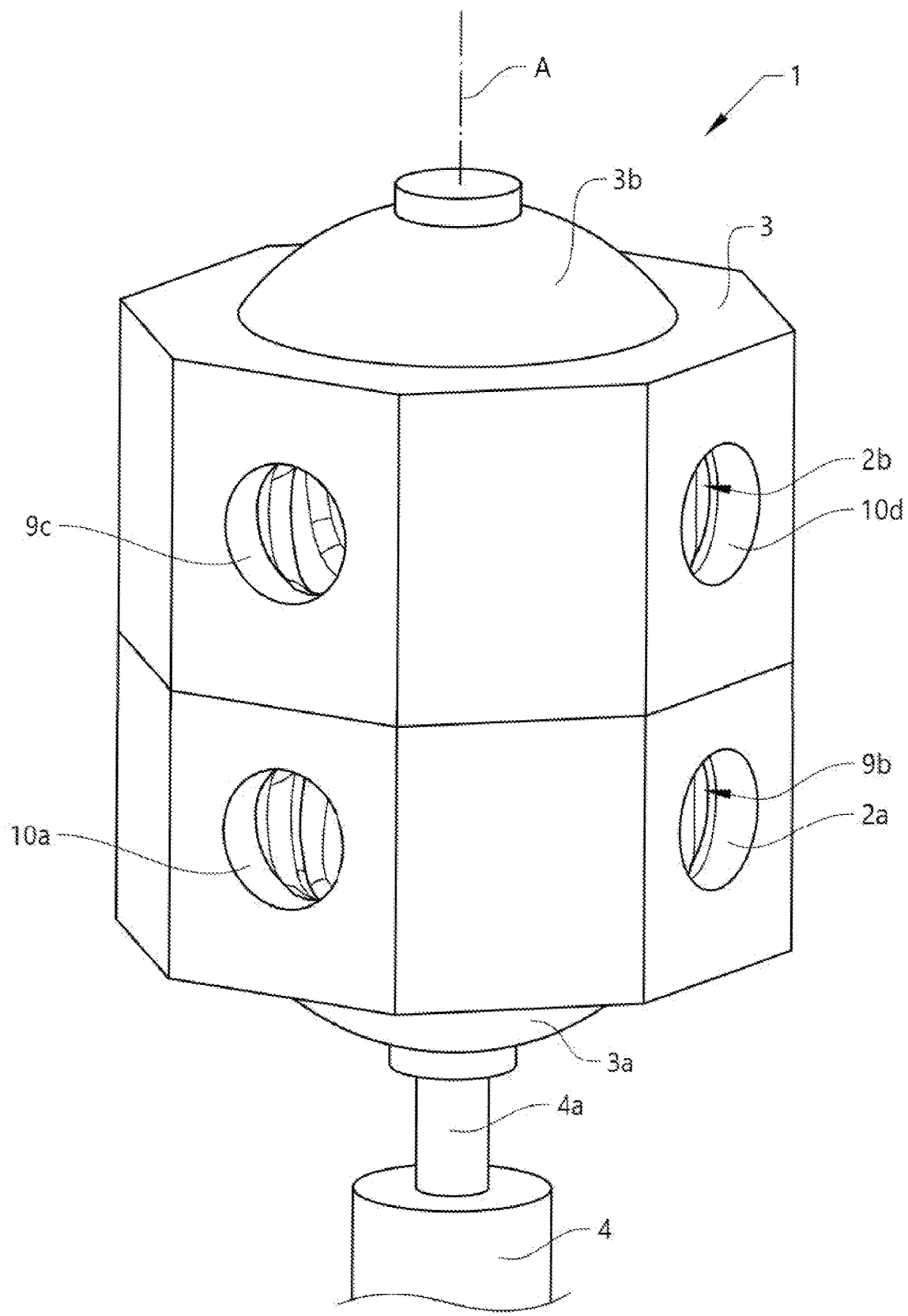
FIG. 2 shows schematically, in a perspective view, the valve unit according to the disclosure.

FIGS. 1 and 2 schematically show a valve unit 1 for a vehicle thermal management system S. The valve unit 1 is used for controlling the flow of heat transfer fluid or coolant to different system components or units of the vehicle thermal management system S.

In FIG. 1, a schematic layout of a vehicle thermal management system S comprising a valve unit 1 according to the disclosure is shown. The vehicle thermal management system S is arranged in a vehicle V, and vehicle thermal management system S is used in the vehicle V for controlling temperature ranges of different vehicle units or components. The system S may also be used for controlling the temperature ranges of a passenger compartment or similar structure of the vehicle. In the embodiment shown in FIG. 1, the vehicle thermal management system S has a two thermal control loop configuration, and the vehicle thermal management system S comprises a first thermal control loop CL1 in fluid communication with the valve unit 1 and a second thermal control loop CL2 in fluid communication with the valve unit 1. The first thermal control loop CL1 and the second thermal control loop CL2 are connected to the valve unit 1, as will be further described below.

The vehicle thermal management system S is used for controlling the temperature ranges of vehicle units with the heat transfer fluid that is circulated in the first thermal control loop CL1 and the second thermal control loop CL2, and the temperature ranges of the respective thermal control loops are for example depending on the driving conditions of the vehicle and the variations in ambient temperature. The heat transfer fluid may be of any type suitable for vehicle applications.

In the embodiment illustrated in FIG. 1, the first thermal control loop CL1 is connected to a first vehicle unit U1, and the second thermal control loop CL2 is connected to a second vehicle unit U2. The first vehicle unit U1 may for example be a battery temperature regulating unit and the second vehicle unit U2 may for example be a power electronics temperature regulating unit. The battery temperature regulating unit may for example be used for controlling the temperatures of one or more batteries with related components used in the vehicle system. The power electronics temperature regulating unit may for example be used for controlling the temperatures of the power electronic components, such as the electric motor and other electric components being part of the power electronics system.

The thermal control loop configurations and components may be of any conventional type used for vehicle purposes, and will not be described in detail. It should however be understood that the system S may be used for heating or cooling other types of vehicle units or components than the ones described above, depending on the design and construction of the vehicle and the vehicle systems. It should be understood that the respective control loops may include any suitable number of components for controlling the temperature ranges and the flow of heat transfer fluid, such as for example heat exchangers, chillers, heaters, filters, air separators, connectors, fans, valves, circulation pumps, and/or any other components known in the art as related to such thermal systems.

With the valve unit 1, the heat transfer fluid can be controlled to circulate in the first thermal control loop CL1 and the second thermal control loop CL2 in separated or connected flow patterns, depending on the operation of the valve unit 1. The heat transfer fluid is suitably circulated in the respective thermal control loops by a circulation pump integrated into each thermal control loop. In the embodiment illustrated in FIG. 1, the first thermal control loop CL1 comprises a first circulation pump P1, and the second thermal control loop CL2 comprises a second circulation pump P2. The circulation pumps can be used together if the thermal control loops are connected, or used separately if the thermal control loops are separated, which may depend on the driving conditions of the vehicle. This is providing a flexible vehicle thermal management system with different alternatives for the distribution of the heat transfer fluid.

As shown in FIG. 1, the vehicle thermal management system S further comprises a first system component SC1, such as a chiller or radiator, and a second system component SC2, such as a chiller or radiator. The type of component used may vary depending on the configuration of the vehicle thermal management system S. The radiator may be of any suitable type for controlling the temperature of the system, such as a traditional radiator heat-exchanger. The chiller may be of any suitable type for controlling the temperature of the system, such as a chiller connected to a heat pump system.

As illustrated in FIG. 1, the vehicle thermal management system S further comprises a first component circuit CC1 for the first system component SC1, and a second component circuit CC2 for the second system component SC2. The first component circuit CC1 and the second component circuit CC2 are connected to the valve unit 1.

The vehicle thermal management system S may further comprise a control unit 13 for controlling the system components, the temperature ranges, and the flow of heat transfer fluid. The respective thermal control loops and component circuits are connecting the valve unit 1 to the vehicle units or components with conduits, pipes or other suitable connection means. The vehicle thermal management system S according to the disclosure is designed and constructed in a way so that the system is adapted for being operated in different operational modes controlled by the control unit 13, where the heat transfer fluid is efficiently circulated to the vehicle units or components.

The valve unit 1 comprises a first valve body 2a, a second valve body 2b, and a housing structure 3. The first valve body 2a and the second valve body 2b are arranged within the housing structure 3 and rotatably arranged in relation to the housing structure 3 between different valve positions around a common rotational axis A.

The valve unit 1 is further configured with a flow mixing functionality. The housing structure 3 comprises a first mixing chamber 3a arranged in connection to the first valve body 2a and a second mixing chamber 3b arranged in connection to the second valve body 2b. The first mixing chamber 3a is arranged as an internal volume in the valve unit 1 configured for receiving heat transfer fluid flow from two or more inlet flow ports of the housing structure 3 via the first valve body 2a, and distributing a mixed flow of heat transfer fluid to one or more outlet flow ports of the housing structure 3 via the first valve body 2a. The second mixing chamber 3b is arranged as an internal volume in the valve unit 1 configured for receiving heat transfer fluid flow from two or more inlet flow ports of the housing structure 3 via the second valve body 2b, and distributing a mixed flow of heat transfer fluid to one or more outlet flow ports of the housing structure 3 via the second valve body 2b.

Figure 3:
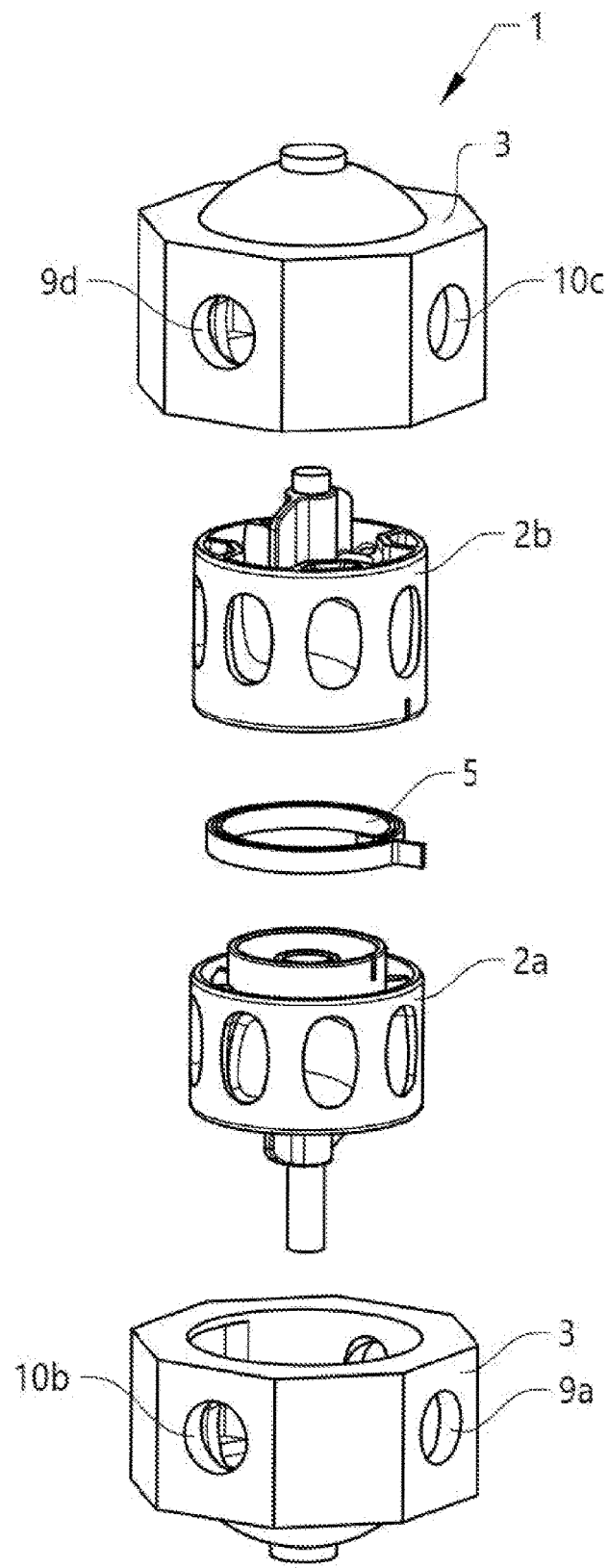
FIG. 3 shows schematically, in an exploded perspective view, the valve unit according to the disclosure.
Figure 4:
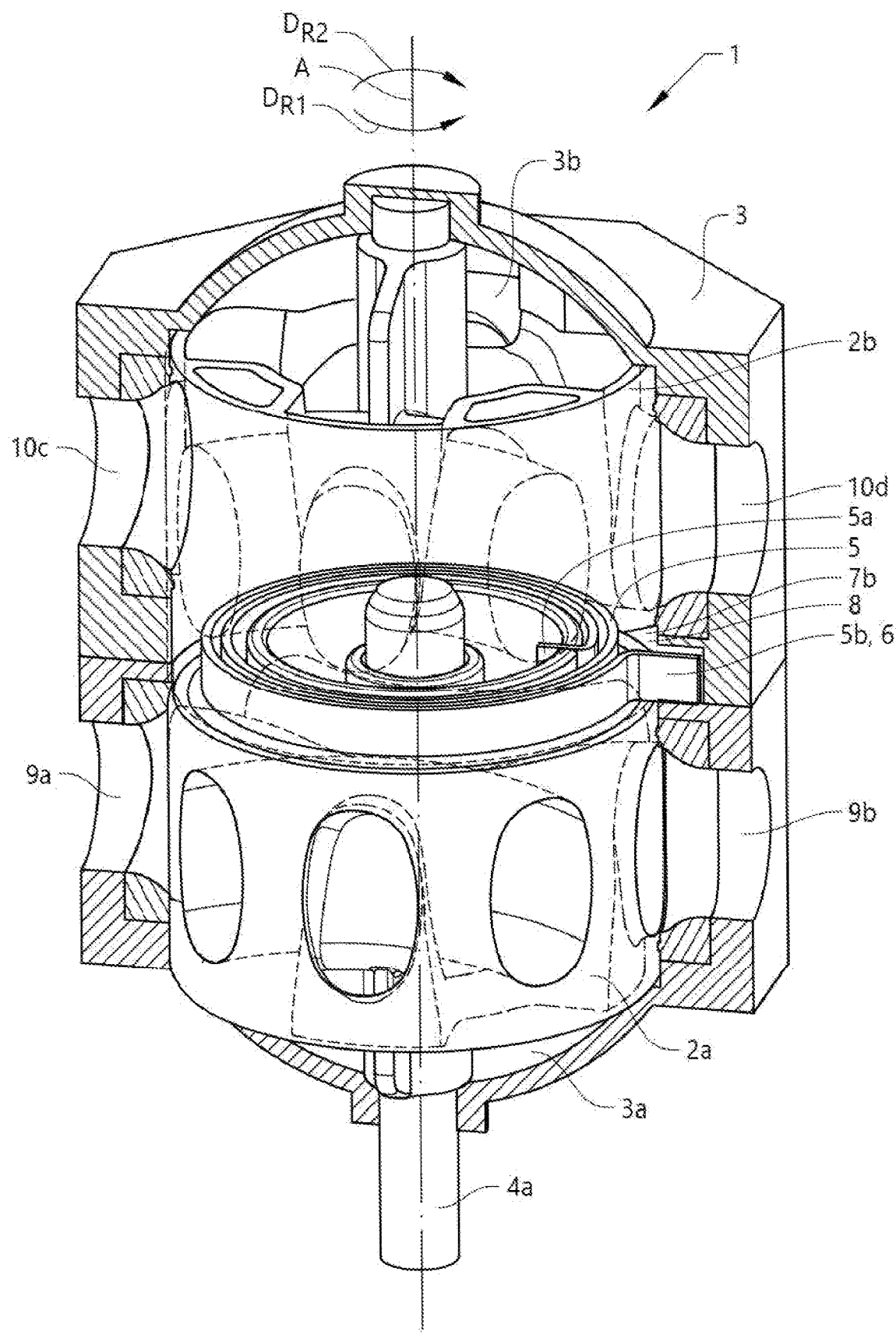
FIG. 4 shows schematically, in a cross-sectional perspective view, the valve unit according to the disclosure.
Figure 5A:
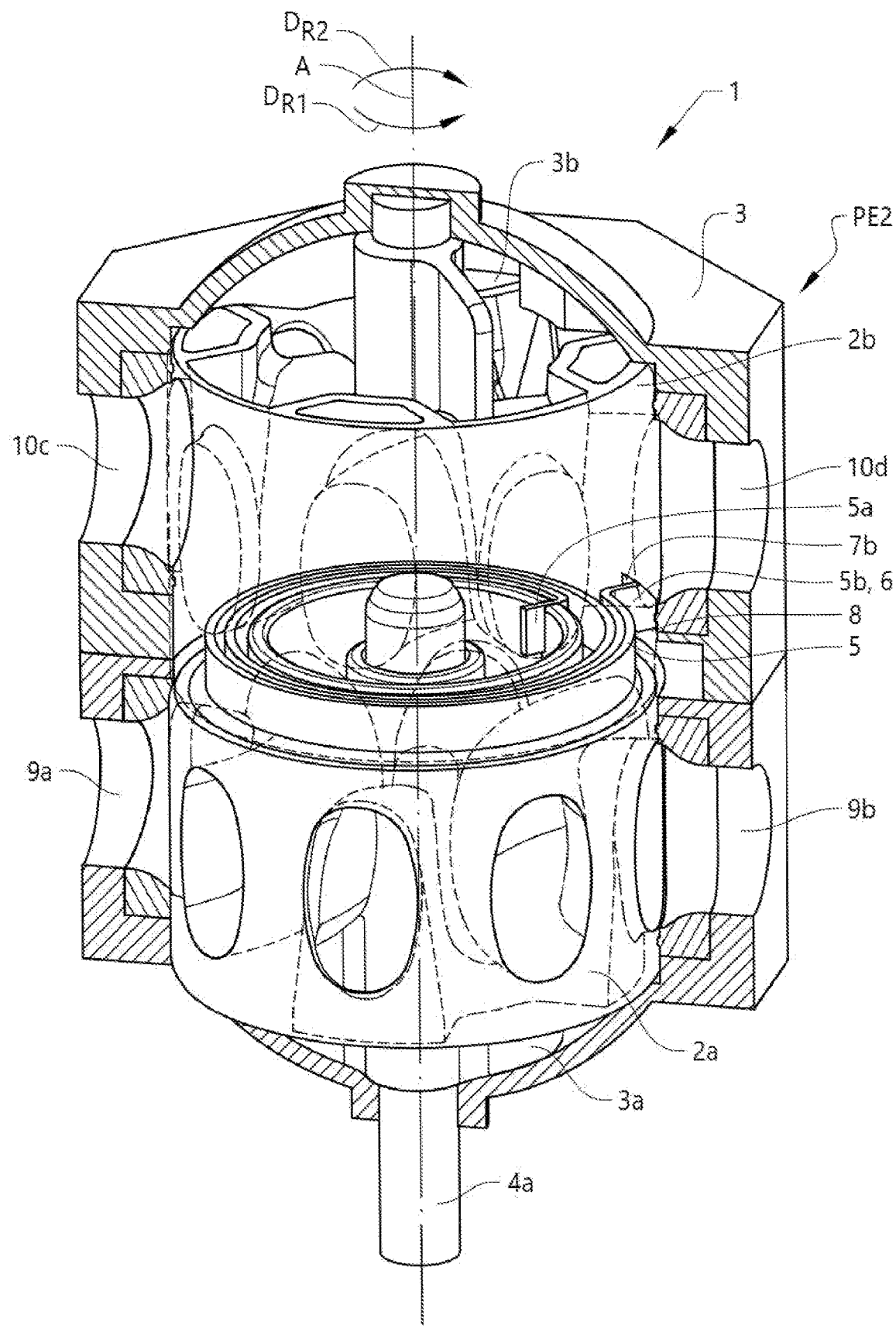
FIGS. 5A-5B show schematically, in cross-sectional perspective views, the valve unit in different valve body positions according to the disclosure.
Figure 5B:
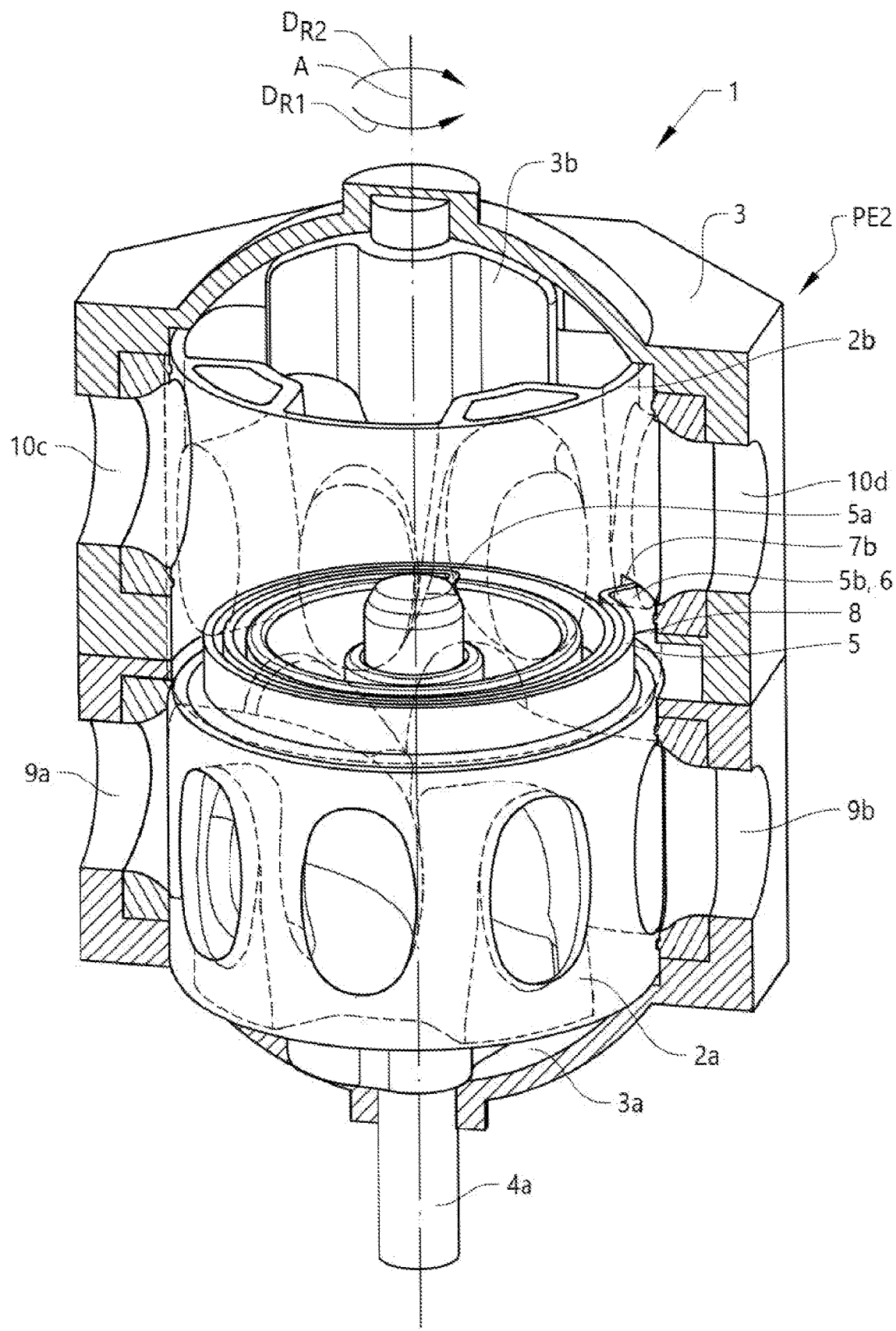

As shown in the embodiment in FIGS. 2-4, the first valve body 2a is connected to an actuator 4 for rotational displacement of the first valve body 2a around the rotational axis A, and the second valve body 2b is connected to the first valve body 2a via a spring 5. The first valve body 2a is attached to the actuator 4 via a drive shaft 4a. The actuator may be of any suitable type, such as for example an electric motor. The first valve body 2a is suitably fixedly arranged on the drive shaft 4a, and the second valve body 2b is guided by a shaft or similar structure allowing a rotational movement around the rotational axis A. The second valve body 2b is configured for being rotatably displaced around the rotational axis A by the spring 5 upon rotational displacement of the first valve body 2a. To operate the vehicle thermal management system S, the first valve body 2a is rotatably displaced around the rotational axis A by means of the actuator 4, and the second valve body 2b is rotatably displaced around the rotational axis A by means of the spring 5 upon rotational displacement of the first valve body 2a. The valve bodies are configured to either move at the same time or move independently from each other, as will be further described below. The housing structure 3 may be arranged with seals or similar structures for preventing leakage between the housing structure 3 and the respective valve bodies.

The spring 5 is defined as an elastic element, and may have any suitable design and configuration for rotatably displacing the second valve body 2b around the rotational axis A upon rotational displacement of the first valve body 2a. The elastic element is capable of returning to its original state, or to essentially its original state, after being deformed, stretched, compressed or expanded. The elastic element may be made of any suitable material, such as for example metals and metallic materials, composite materials, or elastomeric materials. In the illustrated embodiment, the spring is configured as a traditional torsion spring. In the following, the valve unit 1 will be described with a spring 5 having a torsion spring configuration.

With the configuration of the thermal management system S in the embodiment illustrated in FIG. 1, the first thermal control loop CL1 is connected to the valve unit 1, and comprises the first vehicle unit U1. The first thermal control loop CL1 is in fluid communication with the first valve body 2a and the second valve body 2b. The first component circuit CC1 is connected to the valve unit 1, and comprises the first system component SC1. The first component circuit CC1 is in fluid communication with the first valve body 2a and the second valve body 2b. The second thermal control loop CL2 is connected to the valve unit 1, and comprises the second vehicle unit U2. The second thermal control loop CL2 is in fluid communication with the first valve body 2a and the second valve body 2b. The second component circuit CC2 is connected to the valve unit 1, and comprises the second system component SC2. The second component circuit CC2 is in fluid communication with the first valve body 2a and the second valve body 2b. It should however be understood that the system may have other configurations than the one illustrated in FIG. 1, depending on the system and vehicle design.

As shown in for example FIGS. 1-3 and 9, the housing structure 3 comprises a first inlet flow port 9a, a second inlet flow port 9b, a first outlet flow port 10a, and a second outlet flow port 10b, configured for connecting the housing structure 3 to at least the first thermal control loop CL1 and the second thermal control loop CL2, and configured for being in fluid communication with the first valve body 2a. The housing structure 3 further comprises a third inlet flow port 9c, a fourth inlet flow port 9c, a third outlet flow port 10c, and a fourth outlet flow port 10d, configured for connecting the housing structure 3 to at least the first thermal control loop CL1 and the second thermal control loop CL2, and configured for being in fluid communication with the second valve body 2b.

As shown in for example FIGS. 1-3 and 9, the first thermal control loop CL1 is connected to the first inlet flow port 9a for allowing flow of heat transfer fluid from the first thermal control loop CL1 into the valve unit 1, where the inlet flow from the first thermal control loop CL1 is controlled by the first valve body 2a. The first thermal control loop CL1 is further connected to the third outlet flow port 10c for allowing flow of heat transfer fluid out from the valve unit 1 into the first thermal control loop CL1, where the outlet flow from valve unit 1 into the first thermal control loop CL1 is controlled by the second valve body 2b.

As shown in for example FIGS. 1-3 and 9, the second thermal control loop CL2 is connected to the second inlet flow port 9b for allowing flow of heat transfer fluid from the second thermal control loop CL2 into the valve unit 1, where the inlet flow from the second thermal control loop CL2 is controlled by the first valve body 2a. The second thermal control loop CL2 is further connected to the fourth outlet flow port 10d for allowing flow of heat transfer fluid out from the valve unit 1 into the second thermal control loop CL2, where the outlet flow from valve unit 1 into the second thermal control loop CL2 is controlled by the second valve body 2b.

As shown in for example FIGS. 1-3 and 9, the first component circuit CC1 is connected to the third inlet flow port 9c for allowing flow of heat transfer fluid from the first component circuit CC1 into the valve unit 1, where the inlet flow from the first component circuit CC1 is controlled by the second valve body 2b. The first component circuit CC1 is further connected to the first outlet flow port 10a for allowing flow of heat transfer fluid out from the valve unit 1 into the first component circuit CC1, where the outlet flow from valve unit 1 into the first component circuit CC1 is controlled by the first valve body 2a.

As shown in for example FIGS. 1-3 and 9, the second component circuit CC2 is connected to the fourth inlet flow port 9d for allowing flow of heat transfer fluid from the second component circuit CC2 into the valve unit 1, where the inlet flow from the second component circuit CC2 is controlled by the second valve body 2b. The second component circuit CC2 is further connected to the second outlet flow port 10b for allowing flow of heat transfer fluid out from the valve unit 1 into the second component circuit CC2, where the outlet flow from valve unit 1 into the second component circuit CC2 is controlled by the first valve body 2a.

The first valve body 2a comprises a first valve flow channel 11a and a second valve flow channel 11b, as shown in FIGS. 7A-7D. The first valve flow channel 11a is configured for connecting the first inlet flow port 9a or the second inlet flow port 9b to the first outlet flow port 10a or the second outlet flow port 10b, depending on the rotational position of the first valve body 2a around the rotational axis A in relation to the housing structure 3. The second valve flow channel 11a is configured for connecting the first inlet flow port 9a or the second inlet flow port 9b to the first outlet flow port 10a or the second outlet flow port 10b, depending on the rotational position of the first valve body 2a around the rotational axis A in relation to the housing structure 3.

Figure 7A:
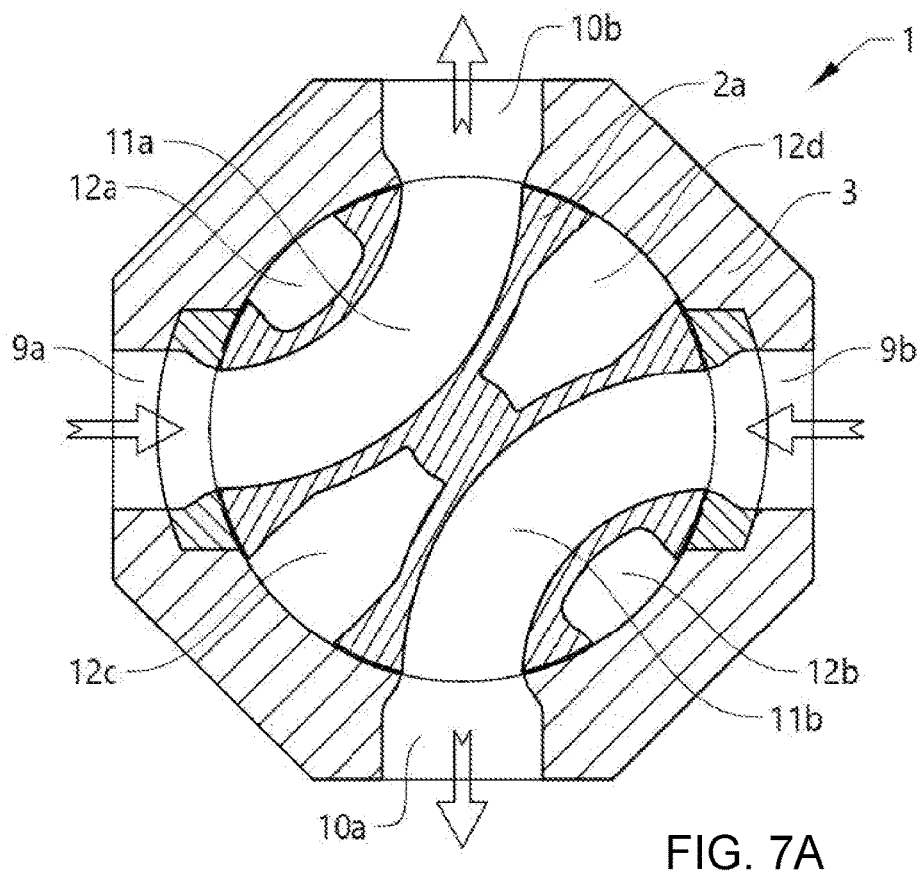
FIGS. 7A-7D show schematically, in cross-sectional views, a first valve body in different valve body positions according to the disclosure.
Figure 7B:
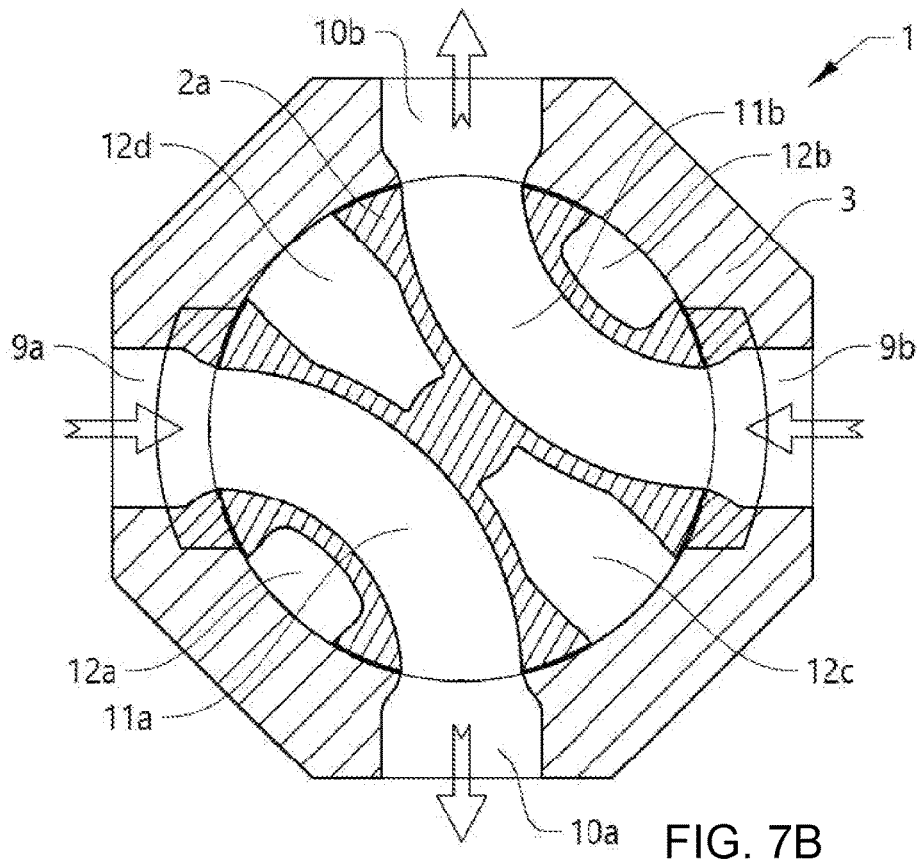
Figure 7C:
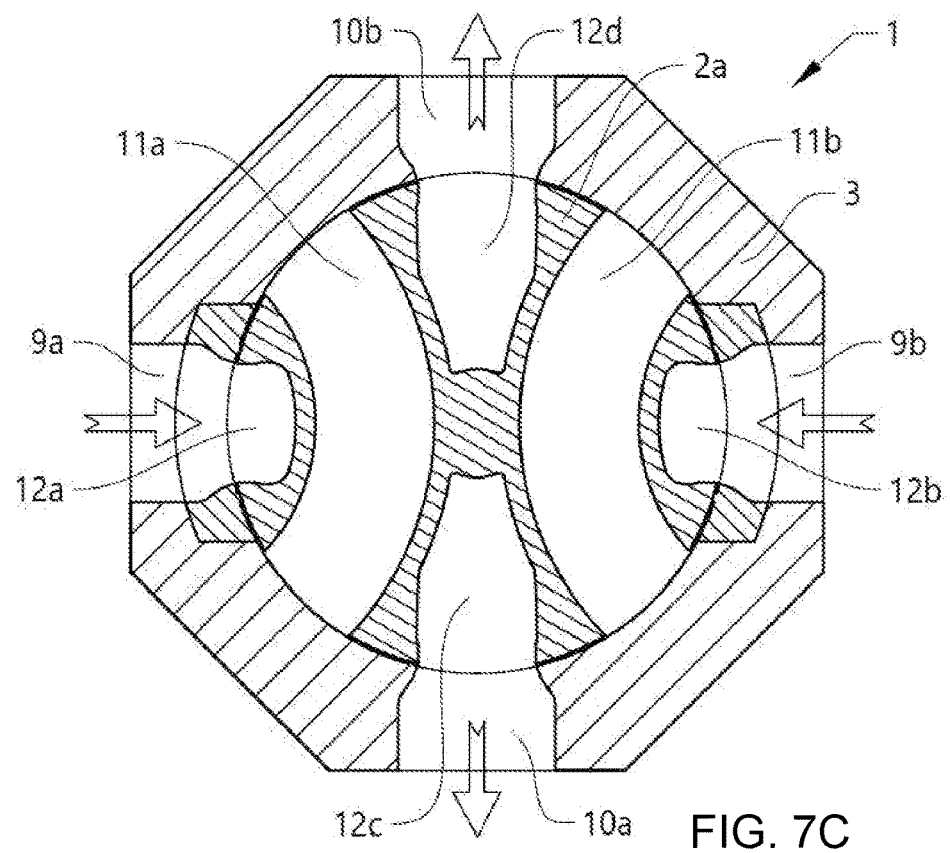
Figure 7D:
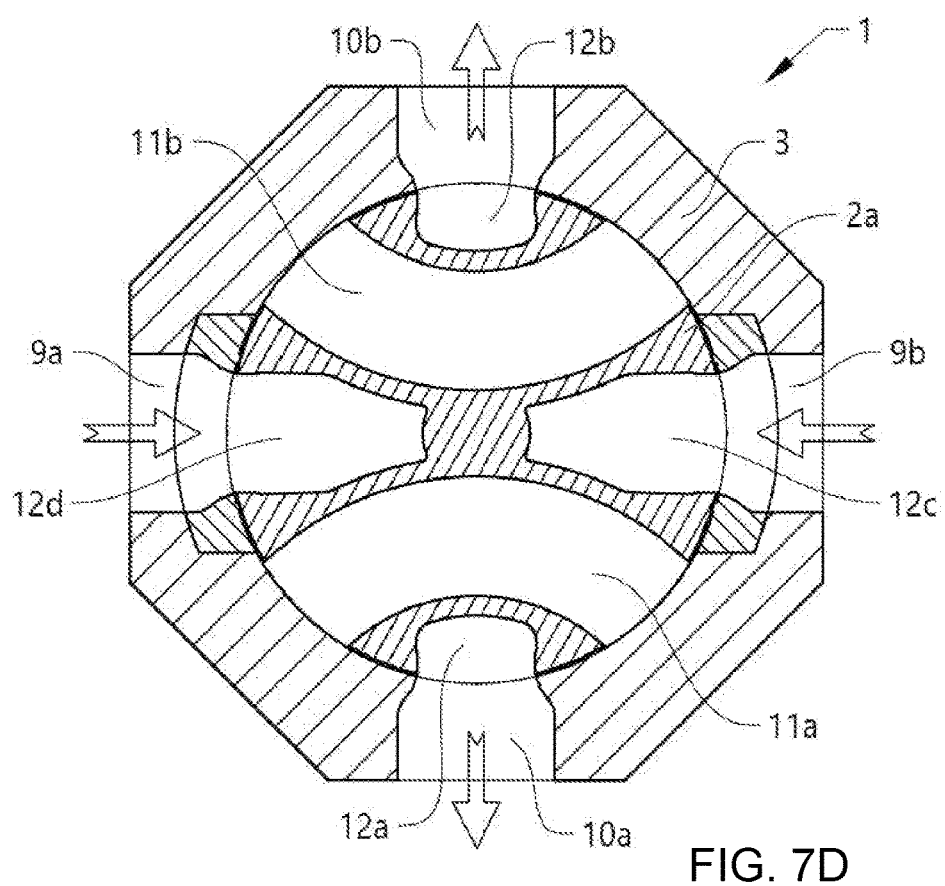

As shown in the valve body position for the first valve body 2a in FIG. 7A, the first valve flow channel 11a is connecting the first inlet flow port 9a and the second outlet flow port 10b, and the second valve flow channel 11b is connecting the second inlet flow port 9b and the first outlet flow port 10a. By rotating the first valve body 2a around the rotational axis A to a different valve body position, as shown in FIG. 7B, the valve unit 1 can instead be arranged to connect the first inlet flow port 9a and the first outlet flow port 10a by the first valve flow channel 11a, and connect the second inlet flow port 9b and the second outlet flow port 10b by the second valve flow channel 11b. By rotating the first valve body 2a around the rotational axis A, different non-illustrated flow patterns can be established. The first inlet flow port 9a can instead be connected to the second outlet flow port 10b by the second valve flow channel 11b, and the second inlet flow port 9b to the first outlet flow port 10a by the first valve flow channel 11a. Alternatively, the first inlet flow port 9a can instead be connected to the first outlet flow port 10a by the second valve flow channel 11b, and the second inlet flow port 9b to the second outlet flow port 10b by the first valve flow channel 11a.

The first valve flow channel 11a and the second valve flow channel 11b are suitably separately arranged from each other within the first valve body 2a, preventing flow of heat transfer fluid between the first valve flow channel 11a and the second valve flow channel 11b.

The second valve body 2b comprises a third valve flow channel 11c and a fourth valve flow channel 11d, as shown in FIGS. 8A-8D. The third valve flow channel 11c is configured for connecting the third inlet flow port 9c or the fourth inlet flow port 9d to the third outlet flow port 10c or the fourth outlet flow port 10d, depending on the rotational position of the second valve body 2b around the rotational axis A in relation to the housing structure 3. The fourth valve flow channel 11d is configured for connecting the third inlet flow port 9c or the fourth inlet flow port 9d to the third outlet flow port 10c or the fourth outlet flow port 10d depending on the rotational position of the second valve body 2b around the rotational axis A in relation to the housing structure 3.

Figure 8A:
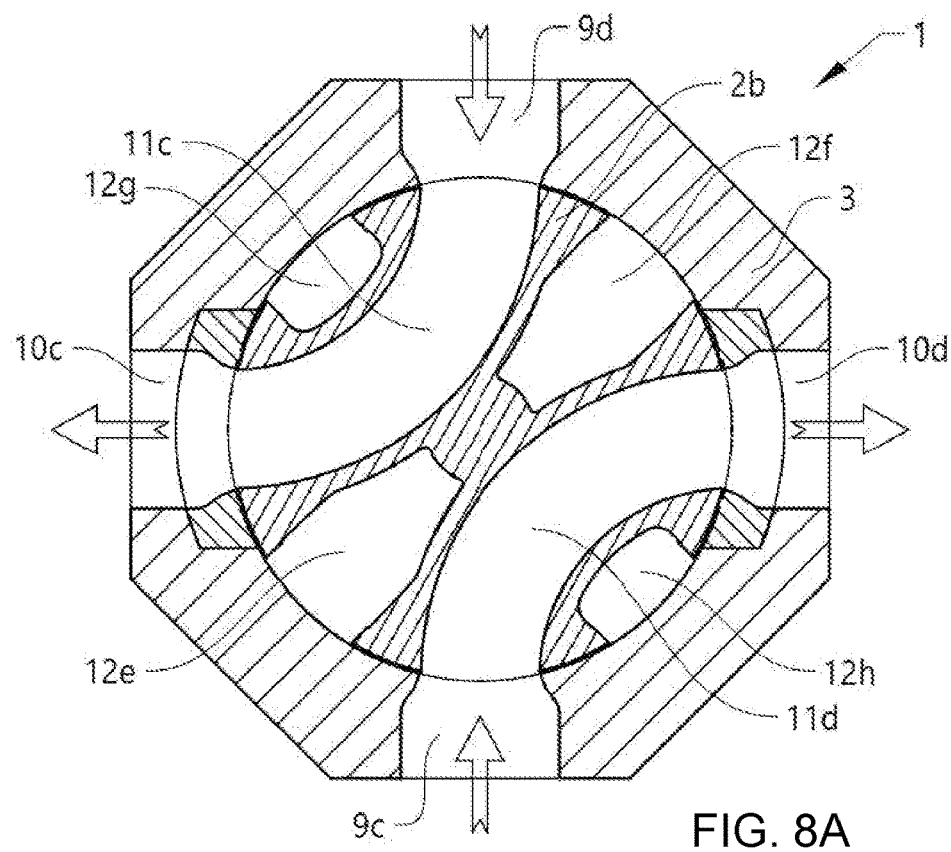
FIGS. 8A-8D show schematically, in cross-sectional views, a second valve body in different valve body positions according to the disclosure.
Figure 8B:
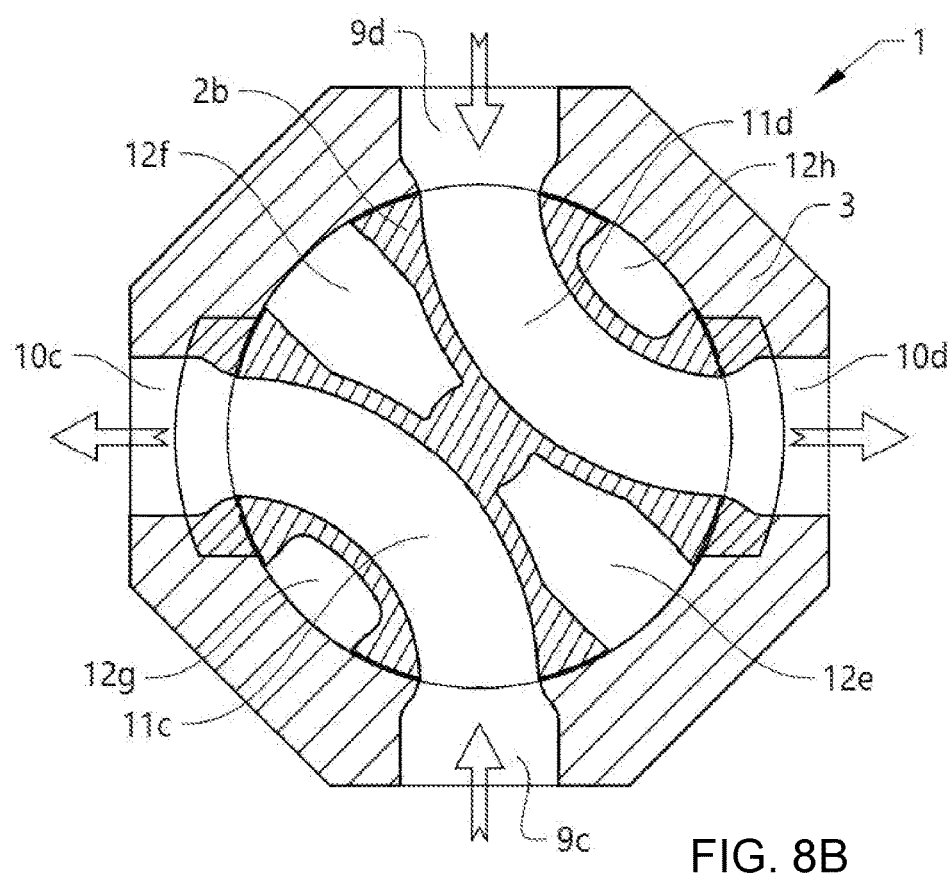
Figure 8C:
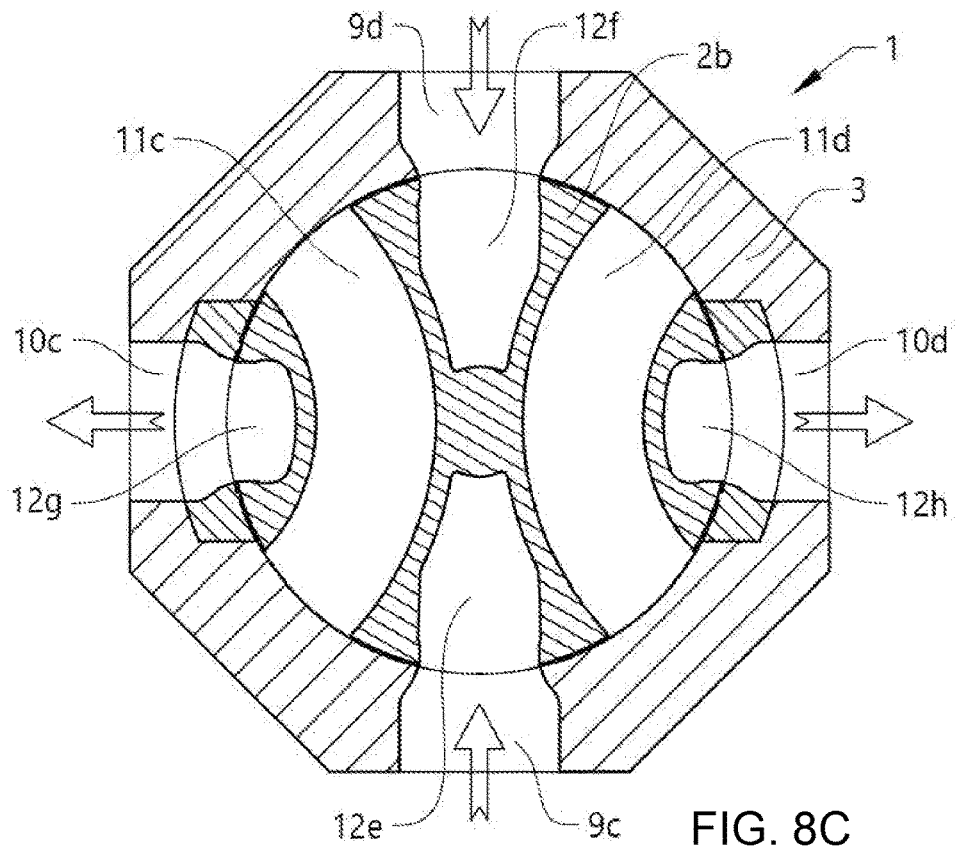
Figure 8D:
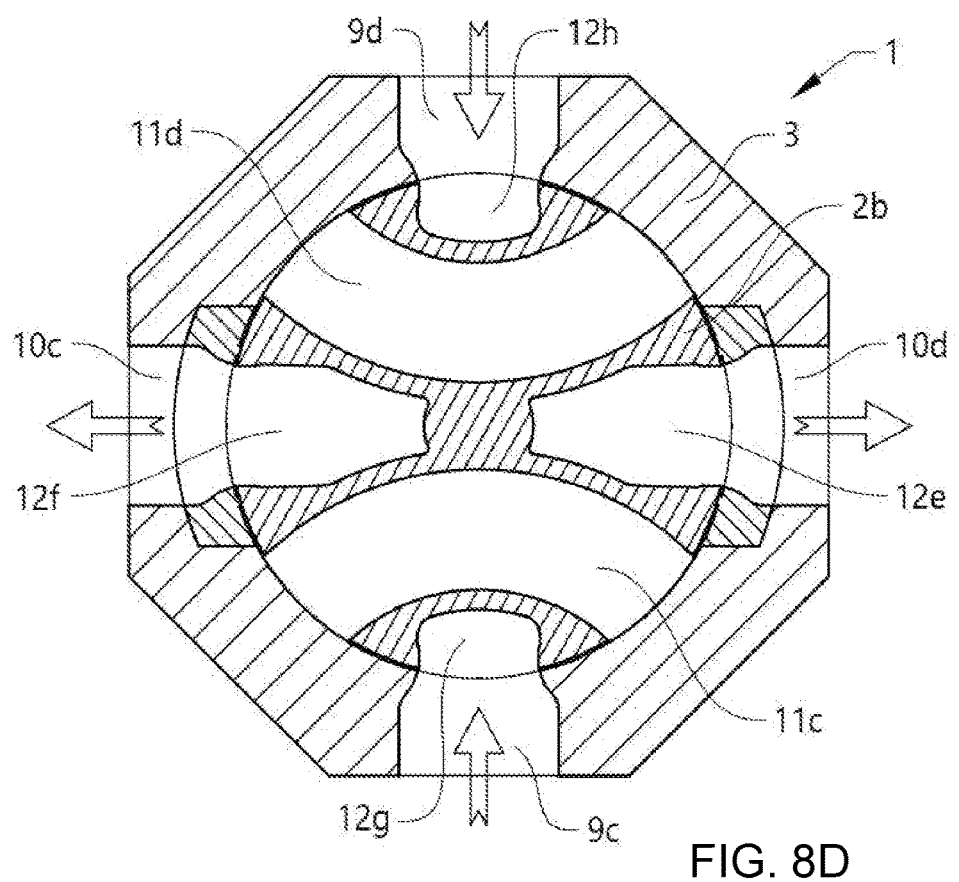

As shown in the valve body position for the second valve body 2a in FIG. 8A, the third valve flow channel 11c is connecting the fourth inlet flow port 9d and the third outlet flow port 10c, and the fourth valve flow channel 11d is connecting the third inlet flow port 9c and the fourth outlet flow port 10d. The second valve body 2b may be rotated around the rotational axis A to a different valve body position, as shown in FIG. 8B, to instead be arranged to connect the fourth inlet flow port 9d and the fourth outlet flow port 10d by the fourth valve flow channel 11d, and connect the third inlet flow port 9c and the third outlet flow port 10c by the third valve flow channel 11c. By rotating the second valve body 2b around the rotational axis A, different non-illustrated flow patterns can be established. The fourth inlet flow port 9d can instead be connected to the third outlet flow port 10c by the fourth valve flow channel 11d, and the third inlet flow port 9c to the fourth outlet flow port 10d by the third valve flow channel 11c. Alternatively, the fourth inlet flow port 9d can instead be connected to the fourth outlet flow port 10d by the third valve flow channel 11c, and the third inlet flow port 9c to the third outlet flow port 10c by the fourth valve flow channel 11d.

The third valve flow channel 11c and the fourth valve flow channel 11d are suitably separately arranged from each other within the second valve body 2b, preventing flow of heat transfer fluid between the third valve flow channel 11c and the fourth valve flow channel 11d.

From the configuration of the valve unit 1 described above, it is understood that depending on the positioning of the first valve body 2a and the second valve body 2b in relation to each other and/or in relation to the housing structure 3, different flow patterns of the vehicle thermal managements system S can be established. The first thermal control loop CL1 may for example be connected to the first component circuit CC1 or the second component circuit CC2 in separated flow patterns. The second thermal control loop CL2 may in a similar way for example be connected to the second component circuit CC2 or the first component circuit CC1 in separated flow patterns. It may also be possible to connect all of the first thermal control loop CL1, the first component circuit CC1, the second thermal control loop CL2, and the second component circuit CC2 in series to form combined flow patterns.

Figure 9:
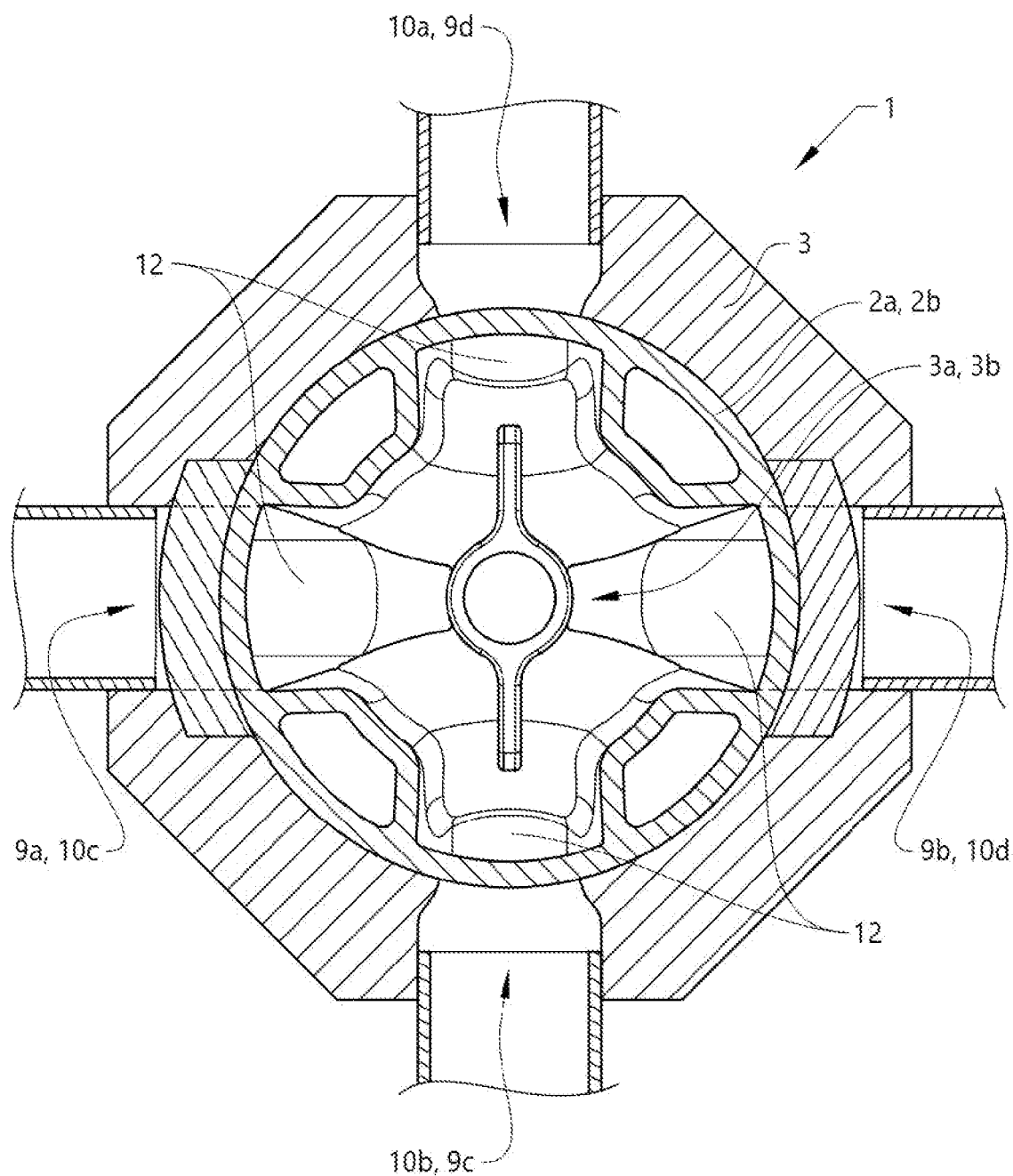
FIG. 9 shows schematically, in a configurational view from below or above, the valve unit with a valve body according to the disclosure.

To further increase the flexibility of the vehicle thermal management system S, the valve unit is configured with a flow mixing functionality, as described above. As shown in the embodiment in for example FIGS. 2, 4, 5A-5B, and 9, the housing structure 3 comprises a first mixing chamber 3a arranged in connection to the first valve body 2a and a second mixing chamber 3b arranged in connection to the second valve body 2b. In FIG. 9, the first mixing chamber 3b is schematically illustrated in a cross-sectional view from below, and the second mixing chamber 3b is illustrated in a cross-sectional view from above, where below and above are referring to the positioning of the valve unit 1 in FIG. 4. The respective mixing chambers are arranged as internal volumes in the valve unit 1 for receiving heat transfer fluid flow from the respective corresponding inlet flow ports and distributing a mixed flow of heat transfer fluid to the respective corresponding outlet flow ports, and thus allowing heat transfer fluid from different loops or circuits to be mixed. By changing the position of the first valve body 2a and/or the second valve body 2b around the rotational axis A the flow of heat transfer fluid can be changed from the flow patterns described above to mixed flow patterns. The mixed flow patterns are controlling the temperature for the respective units and components by mixing the flows of heat transfer fluid. It may be possible to change the position of both the first valve body 2a and the second valve body 2b to mixed flows, or alternatively only the first valve body 2a or the second valve body 2b to mixed flows.

As shown in FIGS. 7A-7D, the first valve body 2a comprises a first mixing flow channel 12a, a second mixing flow channel 12b, a third mixing flow channel 12c, and a fourth mixing flow channel 12b. Each mixing flow channel 12a,12b,12c,12d is configured for connecting any of the first inlet flow port 9a, the second inlet flow port 9b, the first outlet flow port 10a, and the second outlet flow port 10b to the first mixing chamber 3a. In the valve body position shown in FIG. 7C, the first inlet flow port 9a is connected to the first mixing flow channel 12a, the second inlet flow port 9b is connected to the second mixing flow channel 12b, the first outlet flow port 10a is connected to the third mixing flow channel 12c, and the second outlet flow port 10b is connected to the fourth mixing flow channel 12d. With this configuration, the flows from the first thermal control loop CL1 via the first inlet flow port 9a and the second thermal control loop CL2 via the second inlet flow port 9b are mixed in the first mixing chamber 3a, for further distribution to the first component circuit CC1 via the first outlet flow port 10a and the second component circuit CC2 via the second outlet flow port 10b.

As shown in FIGS. 8A-8D, the second valve body 2b comprises a fifth mixing flow channel 12e, a sixth mixing flow channel 12f, a seventh mixing flow channel 12g, and an eight mixing flow channel 12h. Each mixing flow channel 12e,12f,12g,12h is configured for connecting any of the third inlet flow port 9c, the fourth inlet flow port 9d, the third outlet flow port 10c, and the fourth outlet flow port 10d to the second mixing chamber 3b. In the valve body position shown in FIG. 8C, the third inlet flow port 9c is connected to the fifth mixing flow channel 12e, the fourth inlet flow port 9d is connected to the sixth mixing flow channel 12f, the third outlet flow port 10c is connected to the seventh mixing flow channel 12g, and the fourth outlet flow port 10d is connected to the eight mixing flow channel 12h. With this configuration, the flows from the first component circuit CC1 via the third inlet flow port 9c and the second component circuit CC2 via the fourth inlet flow port 9d are mixed in the second mixing chamber 3b, for further distribution to the first thermal control loop CL1 via the third outlet flow port 10c and the second thermal control loop CL2 via the fourth outlet flow port 10d.

The first valve body 2a is connected to the actuator 4 for rotational displacement of the first valve body 2a around the rotational axis A, and the second valve body 2b is connected to the first valve body 2a via a spring 5, as schematically shown in FIGS. 1 and 2. The first valve body 2a is attached to the actuator 4 via the drive shaft 4a, and when rotating the drive shaft 4a with the actuator 4, the first valve body 2a is rotated around the rotational axis A in relation to the housing structure 3 between different valve body positions. The second valve body 2b is configured for being rotatably displaced around the rotational axis A by the spring 5 upon rotational displacement of the first valve body 2a, and when the first valve body 2a is rotated by the actuator 4 the spring 5 is arranged to rotatably displace the second valve body 2b around the rotational axis A in relation to the housing structure 3.

The spring 5 or the second valve body 2b comprises a protruding element 6 configured for being rotatably displaced with the second valve body 2b and configured for limiting the rotational movement of the second valve body 2b in relation to the housing structure 3. The protruding element 6 is arranged to extend out from the second valve body 2b in a radial direction for interaction with the housing structure 3. The protruding element 6 has through the interaction with the housing structure 3 the function to restrict the rotational movement of the second valve body 2b in relation to the housing structure 3.

It should be understood that the protruding element 6 alternatively could be arranged on the housing structure 3 or any other suitable part of the valve unit 1, and configured for limiting the rotational movement of the second valve body 2b in relation to the housing structure 3. The protruding element 6 may have any suitable configuration for restricting the rotational movement of the second valve body 2b, and the second valve body 2b may be provided with means that are interacting with the protruding element 6.

Figure 6A:
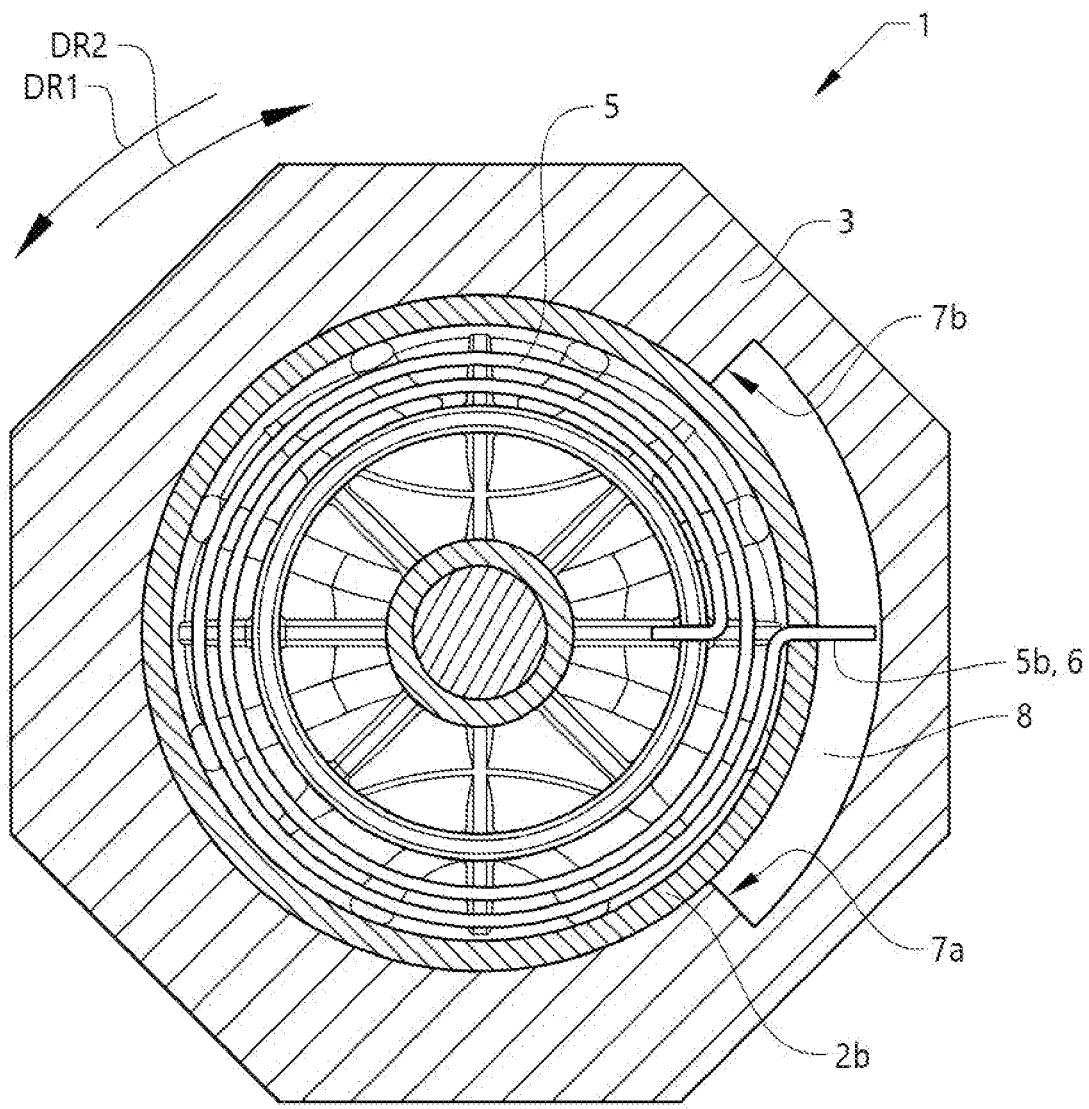
FIGS. 6A-6E show schematically, in views from above, a spring of the valve unit in different valve body positions according to the disclosure.
Figure 6B:
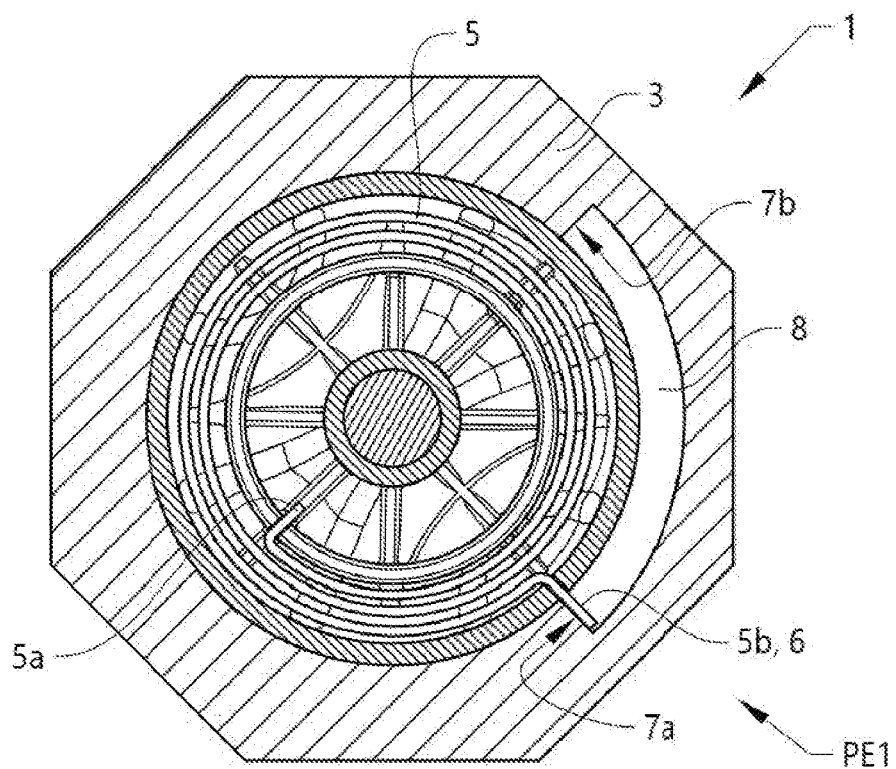

The spring 5 is suitably a torsion spring, and as shown in FIGS. 4, 5A-5B, and 6A-6E, the spring 5 comprises a first end 5a attached to the first valve body 2a and a second end 5b attached to the second valve body 2b. In the illustrated embodiment, the spring ends are configured as bended portions of the spring 5 and each of the valve bodies may comprise a slot or similar arrangement for attaching the respective spring end to the valve body. With the attachment of the spring ends to the respective valve bodies, a rotational force can be transferred by the spring 5 from the first valve body 2a to the second valve body 2b, when the first valve body 2a is rotated by the actuator 4. In order to both control the rotational movement of the second valve body 2b and to overcome frictional forces between the second valve body 2b and the housing structure 3, the spring 5 is configured for rotatably displacing the second valve body 2b upon a spring tension T at least equal to a predetermined spring tension value $T_{PD}$. When the spring 5 is in a low tension state below the predetermined spring tension value $T_{PD}$, as shown in FIG. 6B, it is possible to rotate the first valve body 2a with the actuator 4 without transferring any rotational force to the second valve body 2b via the spring 5, such as between the positions of the spring shown in FIGS. 6B and 6C. Thus, below the predetermined spring tension value $T_{PD}$ the second valve body 2b is prevented from being rotatably displaced by the spring 5. The spring tension T is dependent on a relative angular displacement of the first valve body 2a in relation to the second valve body 2b around the rotational axis A. By rotating the first valve body 2a in a first rotational direction $D_{R1}$ around the rotational axis A, the spring tension T is increasing. By rotating the first valve body 2a in a second rotational direction $D_{R2}$ around the rotational axis A opposite the first rotational direction $D_{R1}$, the spring tension T is decreasing.

In the embodiment illustrated in FIGS. 4, 5A-5B, and 6A-6E, the second end 5b of the spring 5 is configured as the protruding element 6 extending radially outside of the second valve body 2b. As further shown in FIGS. 4, 5A-5B, and 6A-6E, the housing structure 3 is provided with a slot 8 arranged around a part of the inner periphery of the housing structure 3, and the slot 8 suitably has an arcuate configuration arranged as a groove or similarly configured recess in the housing structure 3. The protruding element 6 is arranged to move within the slot 8 upon movement of the second valve body 2b in relation to the housing structure 3. The slot 8 is delimited by a first blocking member 7a and a second blocking member 7b of the housing structure 3, and the protruding element 6 is arranged to move within the slot 8 between two end positions constituted by the first blocking member 7a and the second blocking member 7b. The first blocking member 7a is arranged as a wall section in a first end of the slot 8, and the second blocking member 7b is arranged as a wall section in a second end of the slot 8, as illustrated in FIGS. 6A-6E. With this configuration, the slot 8 is extending between the first blocking member 7a and the second blocking member 7b, and the protruding element 6 is thus configured for being movably arranged within the slot 8 of the housing structure 3 between the first blocking member 7a and the second blocking member 7b, with a corresponding rotational movement of the second valve body 2b.

Figure 6C:
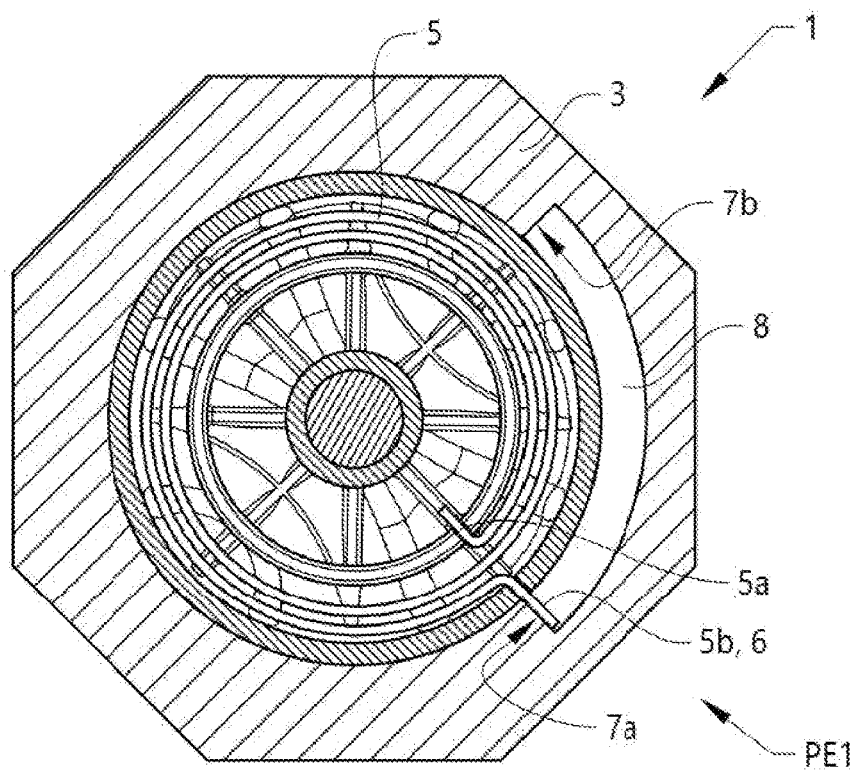
Figure 6D:
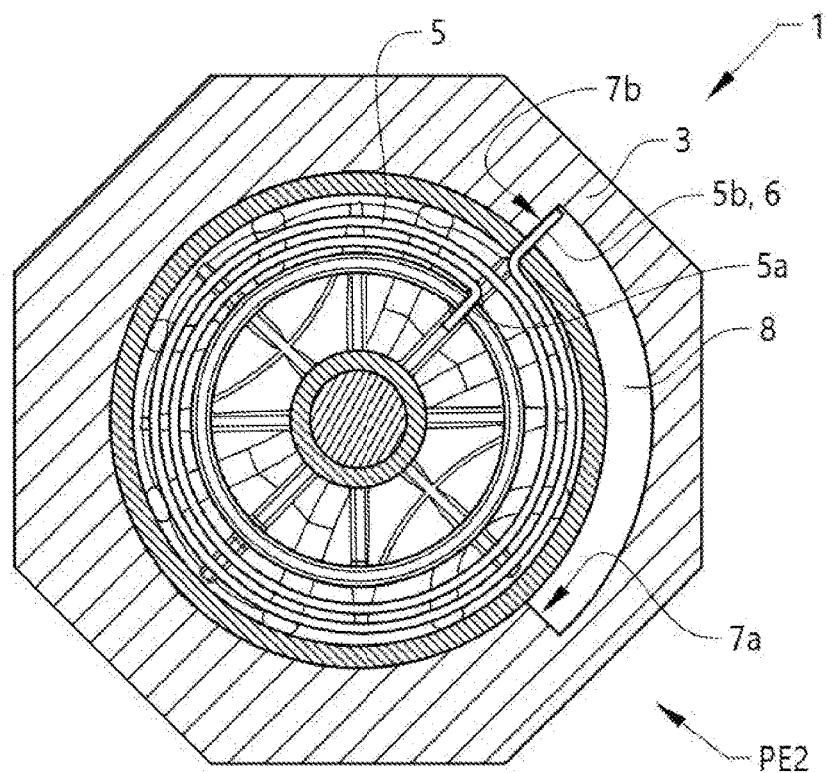
Figure 6E:
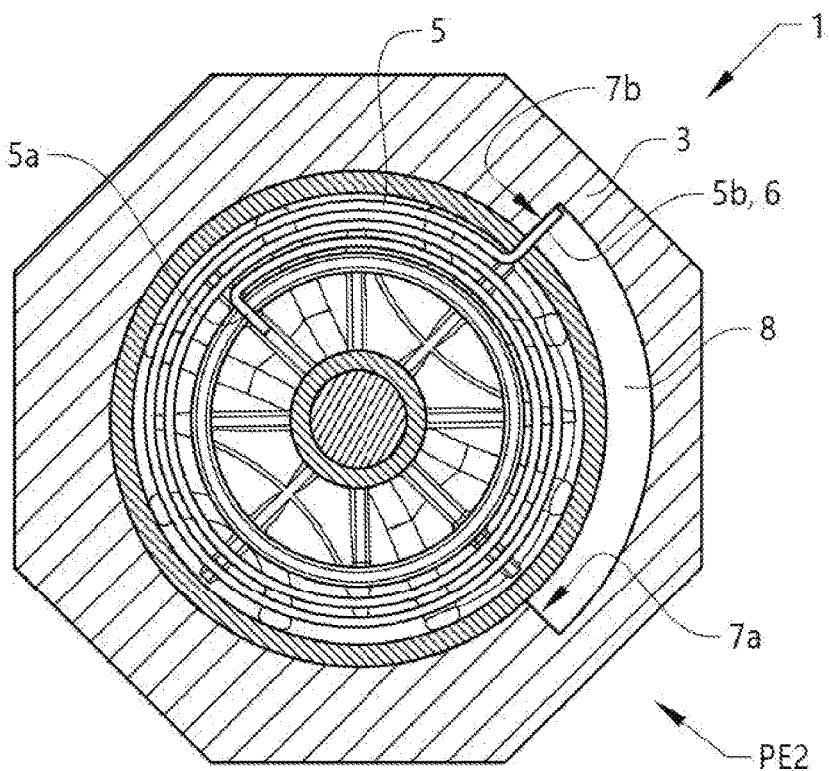

As shown in for example FIGS. 6C and 6D, the protruding element 6 is configured for interacting with the first blocking member 7a and the second blocking member 7b in the respective end positions. In a first end position $P_{E1}$ shown in FIGS. 6B and 6C, the protruding element 6 is in engagement with the first blocking member 7a. In the first end position $P_{E1}$, the first blocking member 7a is preventing a rotational movement of the second valve body 2b around the rotational axis A in the second rotational direction $D_{R2}$, such as when the first end 5a of the spring 5 is moving with the first valve body 2a from the position in FIG. 6C to the position in FIG. 6B. The first blocking member 7a is allowing a rotational movement of the second valve body 2b around the rotational axis A in the first rotational direction $D_{R1}$ towards the second end position $P_{E2}$ if the spring tension T is at least equal to the predetermined spring tension value $T_{PD}$, such as from the position in FIG. 6C to the positions in FIG. 6A or 6D. In a second end position $P_{E2}$ shown in FIGS. 6D and 6E, the protruding element 6 is in engagement with the second blocking member 7b, and in this position the second blocking member 7b is preventing a rotational movement of the second valve body 2b around the rotational axis A in the first rotational direction $D_{R1}$, such as when the first end 5a of the spring 5 is moving with the first valve body 2a from the position in FIG. 6D to the position in FIG. 6E. The second blocking 7b member is allowing a rotational movement of the second valve body 2b around the rotational axis A in the second rotational direction $D_{R2}$ towards the first end position $P_{E1}$, such as from the position in FIG. 6D to the positions in FIG. 6A or 6C. In this way, the first blocking member 7a and the second blocking member 7b are configured for allowing displacement of the second valve body 2b in relation to the housing structure 3 when the protruding element 6 is rotatably displaced with the second valve body 2b between the first blocking member 7a and the second blocking member 7b, and the first blocking member 7a and the second blocking member 7b are configured for preventing displacement of the second valve body 2b in relation to the housing structure 3 when the protruding element 6 is in engagement with the first blocking member 7a or the second blocking member 7b. In FIG. 6A, the protruding element 6 is positioned between the first end position $P_{E1}$ and the second end position $P_{E2}$. The positions of the first end 5a and the second end 5b of the spring 5 in FIG. 6A is corresponding to the positions shown in FIG. 4, the positions of the first end 5a and the second end 5b in FIG. 6D is corresponding to the positions shown in FIG. 5A, and the positions of the first end 5a and the second end 5b in FIG. 6E is corresponding to the positions shown in FIG. 5B.

The second valve body 2b is arranged to be rotatably displaced around the axis A by the spring 5 between different positions determined by the extension of the slot 8, which slot 8 is limited by the first blocking member 7a and the second blocking member 7b. The extension of the slot 8 may vary depending on the design of the valve unit 1 for allowing different valve body positions of the second valve body 2b in relation to the housing structure 3. The first valve body 2a may thus be moved in relation to the housing structure 3 without movement of the second valve body, depending on the position of the second valve body 2b in relation to the first blocking member 7a and the second blocking member 7b, as well as the spring tension T. The second valve body 2b is arranged to move with the first valve body 2a via the spring 5 in both the first rotational direction $D_{R1}$ and the second rotational direction $D_{R2}$. When the protruding element 6 is in engagement with the first blocking member 7a, the first valve body 2a can move in the second rotational direction $D_{R2}$, and also in the first rotational direction $D_{R1}$ until the spring tension T is at least equal to the predetermined spring tension value $T_{PD}$, without any movement of the second valve body 2b. When the protruding element 6 is in engagement with the second blocking member 7b, the first valve body 2a can move in the first rotational direction $D_{R1}$, and also in the second rotational direction $D_{R2}$ when the spring tension T is above the predetermined spring tension value $T_{PD}$, without any movement of the second valve body 2a, since the spring 5 is positioning the protruding element 6 against the second blocking member 7b. The spring 5 is arranged to move the second valve body 2b from the second end position $P_{E2}$ towards the first end position $P_{E1}$ when the spring tension T is essentially equal to the predetermined spring tension value $T_{PD}$.

It should be understood that the mixing chamber configuration of the valve unit may be used in connection to any type of valve unit comprising a housing structure, a valve body and a mixing chamber, where the housing structure comprises at least two inlet flow ports and at least one outlet flow port. Such a valve unit may comprise any of the different features described in the embodiments above. However, the valve unit may have a different configuration and comprise only one valve body, or alternatively two or more valve bodies. Such a valve unit may or may not comprise the spring for displacing a valve body. The housing structure may comprise any suitable number of inlet flow ports and outlet flow ports for one or more valve bodies. Such a valve unit could be used in a thermal management system as described in the embodiments above and be defined, described and exemplified with the features below:

A valve unit for a vehicle thermal management system, wherein the valve unit comprises one or more valve bodies, and a housing structure, wherein each of the one or more valve bodies is arranged within the housing structure and rotatably arranged in relation to the housing structure between different valve positions around a rotational axis, wherein the housing structure comprises two or more inlet flow ports, one or more outlet flow ports, and one or more mixing chambers, wherein each of the one or more mixing chambers is arranged in connection to one of the one or more valve bodies.

In embodiments of the valve unit, each mixing chamber is arranged as an internal volume in the valve unit configured for receiving heat transfer fluid flow from two or more inlet flow ports and distributing a mixed flow of heat transfer fluid to one or more outlet flow ports, allowing the heat transfer fluid from two or more inlet flow ports to be mixed.

In embodiments of the valve unit, the one or more valve bodies of the valve unit are arranged within the housing structure and rotatably arranged in relation to the housing structure between different valve positions around a common rotational axis.

In embodiments of the valve unit, each of the one or more valve bodies of the valve unit arranged in connection to a corresponding mixing chamber comprises three or more mixing flow channels, wherein each mixing flow channel is configured for connecting one of the two or more inlet flow ports or one of the one or more outlet flow ports to the mixing chamber.

In embodiments of the valve unit, at least one of the one or more valve bodies of the valve unit is connected to an actuator for rotational displacement of the valve body around the rotational axis.

In embodiments of the valve unit, at least one of the one or more valve bodies of the valve unit is attached to the actuator via a drive shaft.

In embodiments of the valve unit, each valve body of the valve unit further comprises one or more valve flow channels configured for connecting one of the two or more inlet flow ports to one of the one or more outlet flow ports.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the control unit 13 of the vehicle thermal management system S, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor or processors associated with the control unit 13 may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Valve unit
2a: First valve body
2b: Second valve body
3: Housing structure
3a: First mixing chamber
3b: Second mixing chamber
4: Actuator
4a: Drive shaft
5: Spring
5a: First end
5b: Second end
6: Protruding element
7a: First blocking member
7b: Second blocking member
8: Slot
9: Inlet flow port
10: Outlet flow port
11: Valve flow channel
12: Mixing flow channel
13: Control unit
A: Rotational axis
CL1: First thermal control loop
CL2: Second thermal control loop
$D_{R1}$: First rotational direction
$D_{R2}$: Second rotational direction
$P_{E1}$: First end position
$P_{E2}$: Second end position
S: Vehicle thermal management system
SC1: First system component
SC2: Second system component
U1: First vehicle unit
U2: Second vehicle unit
V: Vehicle

What is claimed is:

1. A valve unit for a vehicle thermal management system, wherein the valve unit comprises a first valve body, a second valve body, and a housing structure, wherein the first valve body and the second valve body are arranged within the housing structure and rotatably arranged in relation to the housing structure between different valve positions around a common rotational axis, wherein the first valve body is connected to an actuator for rotational displacement of the first valve body around the rotational axis, wherein the second valve body is connected to the first valve body via a spring, wherein the second valve body is configured for being rotatably displaced around the rotational axis by the spring upon rotational displacement of the first valve body, wherein the housing structure comprises a first mixing chamber arranged in connection to the first valve body and a second mixing chamber arranged in connection to the second valve body.

2. The valve unit according to claim 1, wherein the spring is configured for rotatably displacing the second valve body upon a spring tension at least equal to a predetermined spring tension value, wherein below the predetermined spring tension value the second valve body is prevented from being rotatably displaced by the spring, wherein the spring tension is dependent on a relative angular displacement of the first valve body in relation to the second valve body around the axis.

3. The valve unit according to claim 1, wherein the spring is a torsion spring.

4. The valve unit according to claim 1, wherein the spring comprises a first end attached to the first valve body and a second end attached to the second valve body.

5. The valve unit according to claim 1, wherein the first valve body is attached to the actuator via a drive shaft.

6. The valve unit according to claim 1, wherein the first mixing chamber is arranged as an internal volume in the valve unit configured for receiving heat transfer fluid flow from two or more inlet flow ports of the housing structure via the first valve body, and distributing a mixed flow of heat transfer fluid to one or more outlet flow ports of the housing structure via the first valve body;

wherein the second mixing chamber is arranged as an internal volume in the valve unit configured for receiving heat transfer fluid flow from two or more inlet flow ports of the housing structure via the second valve body, and distributing a mixed flow of heat transfer fluid to one or more outlet flow ports of the housing structure via the second valve body.

7. A vehicle thermal management system comprising a valve unit according to claim 1, wherein the system further comprises a first thermal control loop in fluid communication with the valve unit, and a second thermal control loop in fluid communication with the valve unit.

8. A vehicle comprising a vehicle thermal management system according to claim 7.

9. The valve unit according to claim 1, wherein the spring or the second valve body comprises a protruding element, wherein the protruding element is configured for being rotatably displaced with the second valve body and configured for limiting the rotational movement of the second valve body in relation to the housing structure.

10. The valve unit according to claim 9, wherein the housing structure comprises a first blocking member and a second blocking member, wherein the protruding element is configured for interacting with the first blocking member and the second blocking member, wherein the first blocking member and the second blocking member are configured for allowing displacement of the second valve body in relation to the housing structure when the protruding element is rotatably displaced with the second valve body between the first blocking member and the second blocking member, and wherein the first blocking member and the second blocking member are configured for preventing displacement of the second valve body in relation to the housing structure through engagement between the protruding element and the first blocking member or through engagement between the protruding element and the second blocking member.

11. The valve unit according to claim 10, wherein the protruding element is extending radially outside of the second valve body, wherein the protruding element is configured for being movably arranged within a slot of the housing structure, wherein the slot is delimited by the first blocking member and the second blocking member.

12. The valve unit according to claim 1, wherein the housing structure comprises a first inlet flow port, a second inlet flow port, a first outlet flow port, and a second outlet flow port, configured for connecting the housing structure to at least a first thermal control loop and a second thermal control loop, and configured for being in fluid communication with the first valve body;

wherein the housing structure comprises a third inlet flow port, a fourth inlet flow port, a third outlet flow port, and a fourth outlet flow port, configured for connecting the housing structure to at least the first thermal control loop and the second thermal control loop, and configured for being in fluid communication with the second valve body.

13. The valve unit according to claim 12, wherein the first valve body comprises a first mixing flow channel, a second mixing flow channel, a third mixing flow channel, and a fourth mixing flow channel, wherein each mixing flow channel is configured for connecting any of the first inlet flow port, the second inlet flow port, the first outlet flow port, and the second outlet flow port to the first mixing chamber;

wherein the second valve body comprises a fifth mixing flow channel, a sixth mixing flow channel, a seventh mixing flow channel, and an eight mixing flow channel, wherein each mixing flow channel is configured for connecting any of the third inlet flow port, the fourth inlet flow port, the third outlet flow port, and the fourth outlet flow port to the second mixing chamber.

14. The valve unit according to claim 12, wherein the first valve body comprises a first valve flow channel and a second valve flow channel, wherein the first valve flow channel is configured for connecting the first inlet flow port or the second inlet flow port to the first outlet flow port or the second outlet flow port, and wherein the second valve flow channel is configured for connecting the first inlet flow port or the second inlet flow port to the first outlet flow port or the second outlet flow port;

wherein the second valve body comprises a third valve flow channel and a fourth valve flow channel, wherein the third valve flow channel is configured for connecting the third inlet flow port or the fourth inlet flow port to the third outlet flow port or the fourth outlet flow port, and wherein the fourth valve flow channel is configured for connecting the third inlet flow port or the fourth inlet flow port to the third outlet flow port or the fourth outlet flow port.

15. The valve unit according to claim 14, wherein the first valve flow channel and the second valve flow channel are separately arranged from each other within the first valve body, and wherein the third valve flow channel and the fourth valve flow channel are separately arranged from each other within the second valve body.

16. A method for operating a valve unit for a vehicle thermal management system, wherein the valve unit comprises a first valve body, a second valve body, and a housing structure, wherein the first valve body and the second valve body are arranged within the housing structure and rotatably arranged in relation to the housing structure between different valve positions around a common rotational axis, wherein the first valve body is connected to an actuator for rotational displacement of the first valve body around the rotational axis, wherein the second valve body is connected to the first valve body via a spring, wherein the housing structure comprises a first mixing chamber arranged in connection to the first valve body and a second mixing chamber arranged in connection to the second valve body, wherein the method comprises the steps:

rotatably displacing the first valve body around the rotational axis by means of the actuator; and rotatably displacing the second valve body around the rotational axis by means of the spring upon rotational displacement of the first valve body.

17. The method according to claim 16, wherein the first mixing chamber is arranged as an internal volume in the valve unit and the second mixing chamber is arranged as an internal volume in the valve unit, wherein the method further comprises the steps:

receiving heat transfer fluid flow from two or more inlet flow ports of the housing structure via the first valve body into the first mixing chamber, mixing the heat transfer fluid from the two or more inlet flow ports in the first mixing chamber, distributing a mixed flow of heat transfer fluid from the first mixing chamber to one or more outlet flow ports of the housing structure via the first valve body, and/or receiving heat transfer fluid flow from two or more inlet flow ports of the housing structure via the second valve body into the second mixing chamber, mixing the heat transfer fluid from the two or more inlet flow ports in the second mixing chamber, distributing a mixed flow of heat transfer fluid from the second mixing chamber to one or more outlet flow ports of the housing structure via the second valve body.

* * * * *